US008180182B2

(12) United States Patent
Wakayama

(10) Patent No.: US 8,180,182 B2
(45) Date of Patent: May 15, 2012

(54) PROCESSING DEVICE FOR PROCESSING PLURALITY OF POLYGON MESHES, THE DEVICE INCLUDING PLURALITY OF PROCESSORS FOR PERFORMING COORDINATE TRANSFORMATION AND GRADIENT CALCULATIONS AND AN ALLOCATION UNIT TO ALLOCATE EACH POLYGON TO A RESPECTIVE PROCESSOR

(75) Inventor: Yorihiko Wakayama, Osaka (JP)

(73) Assignee: Panasonic Corporation, Osaka (JP)

( * ) Notice: Subject to any disclaimer, the term of this patent is extended or adjusted under 35 U.S.C. 154(b) by 832 days.

(21) Appl. No.: 12/299,518

(22) PCT Filed: May 11, 2007

(86) PCT No.: PCT/JP2007/059698
§ 371 (c)(1),
(2), (4) Date: Nov. 4, 2008

(87) PCT Pub. No.: WO2007/132746
PCT Pub. Date: Nov. 22, 2007

(65) Prior Publication Data
US 2009/0207169 A1 Aug. 20, 2009

(30) Foreign Application Priority Data
May 11, 2006 (JP) ................................. 2006-132164

(51) Int. Cl.
G06K 9/00 (2006.01)
G06K 9/32 (2006.01)
G06T 15/00 (2011.01)
G06T 15/10 (2011.01)
G06T 15/20 (2011.01)
G06F 15/80 (2006.01)

(52) U.S. Cl. ........ 382/304; 382/100; 382/154; 382/296; 382/294; 382/295; 345/505; 345/427; 345/419

(58) Field of Classification Search .................. None
See application file for complete search history.

(56) References Cited

U.S. PATENT DOCUMENTS
5,550,961 A * 8/1996 Chimoto ....................... 345/571
(Continued)

FOREIGN PATENT DOCUMENTS
JP            11/328436        11/1999
(Continued)

OTHER PUBLICATIONS
International Search Report issued Jun. 6, 2007 in the International (PCT) Application of which the present application is the U.S. National Stage.
(Continued)

Primary Examiner — Tom Y Lu
Assistant Examiner — Thomas Conway
(74) Attorney, Agent, or Firm — Wenderoth, Lind & Ponack L.L.P.

(57) ABSTRACT

A processing device performs a geometry process as preprocessing for rendering a three-dimensional object on a display by modeling the three-dimensional object using a polygon mesh. The geometry process includes a vertex process that is performed for each of the vertices of the polygon mesh by a different one of a plurality of processors, and processed vertex data obtained by the vertex process is notified among the processors so that a polygon process can be performed in each of the processors. Because each processor can continuously perform the polygon process immediately after the vertex process, it is possible to suppress the occurrence of the unbalance of timing in performing the vertex process and the polygon process, thereby efficiently performing computation while minimizing the wasteful idle time of the processors.

15 Claims, 23 Drawing Sheets

U.S. PATENT DOCUMENTS

| | | | |
|---|---|---|---|
| 5,714,997 A * | 2/1998 | Anderson | 348/39 |
| 6,704,018 B1 * | 3/2004 | Mori et al. | 345/502 |
| 7,843,456 B2 * | 11/2010 | Xu et al. | 345/473 |
| 2006/0013505 A1 * | 1/2006 | Yau et al. | 382/285 |

FOREIGN PATENT DOCUMENTS

| | | |
|---|---|---|
| JP | 11328436 A * | 11/1999 |
| JP | 11-353291 | 12/1999 |
| JP | 2001-118082 | 4/2001 |
| JP | 2004-110330 | 4/2004 |

OTHER PUBLICATIONS

International Preliminary Examination Report (PCT/IPEA/409) issued Apr. 2, 2008 in the International (PCT) Application of which the present application is the U.S. National Stage.

* cited by examiner

PROCESSING DEVICE FOR PROCESSING PLURALITY OF POLYGON MESHES, THE DEVICE INCLUDING PLURALITY OF PROCESSORS FOR PERFORMING COORDINATE TRANSFORMATION AND GRADIENT CALCULATIONS AND AN ALLOCATION UNIT TO ALLOCATE EACH POLYGON TO A RESPECTIVE PROCESSOR

TECHNICAL FIELD

The present invention relates to a geometry process for rendering a polygon mesh.

BACKGROUND ART

In recent years, so-called "mobile games", which operate in mobile apparatuses such as mobile phones, have been widely played, and a geometry process is critical in developing the games. Such mobile games include games in which a three-dimensional object is modeled by a combination of polygonal figures called polygons, and rendered on a display. The modeled three-dimensional object is referred to as "polygon mesh" because of a structure thereof in which polygons are filled in a mesh pattern. The polygon mesh is expressed by multiple vertices and edges that connect the multiple vertices. To simplify the calculation, triangles are usually selected to be used as a polygon. When rendering a polygon mesh, it is necessary to perform a vertex process and a polygon process. The vertex process is a process for performing coordinate transformation and illuminance calculation on the vertices of a polygon. The polygon process is for performing calculation with respect to the gradients of the edges of a polygon, an internal region thereof, and such. These processes are collectively referred to as a geometry process, since both of the processes mainly include a geometrical process for arranging a polygon mesh in a virtual space so as to project the polygon mesh on a screen. This geometry process is a bottleneck in rendering a polygon mesh.

Patent Document 1 discloses a method for performing the vertex process and the polygon process, with use of a plurality of processors so as to perform the geometry process at high speed. According to this method, processors that perform the vertex process are different from processors that perform the polygon process. The vertex process is performed for each vertex by a plurality of processors in parallel. A result obtained by the vertex process is transmitted to a main processor.

Patent Document 1: Japanese Laid-Open Patent Application No. 11-328436

DISCLOSURE OF THE INVENTION

The Problems the Invention is Going to Solve

However, the conventional technique has a problem in which the vertex and polygon processes may be performed at unbalanced timings, depending on the time required for the vertex process and the polygon process or the length of a polygon mesh to be rendered. The above-described unbalance means that a processor has idle time for adjusting time. The idle time occurs (i) when the vertex process is performed too quickly, resulting in an overflow of processed vertex data on which the vertex process has been performed (herein after referred to as processed vertex data) and that are waiting for the polygon process, and (ii) when the vertex process is performed too slowly, resulting in a shortage of processed vertex data that is necessary for the polygon process.

The above-described problem occurs because the geometry process is performed in the following manner. First, the vertex process is performed by sequentially reading vertices constituting a polygon mesh. When the vertex process has been completed for all the vertices constituting a first polygon, the polygon process for the first polygon is started. Subsequently, the vertex process is performed on a next vertex in the same polygon mesh, and when the vertex process has been completed for all the vertices constituting a second polygon, the polygon process for the second polygon is started. Therefore, in a case where the polygon process is completed earlier than the vertex process, the processor cannot start the next polygon process until the vertex process is completed. As a result, the processor experiences idle time in which the processor has no process to perform.

Assume here that a polygon mesh is created by a series of connected triangles sharing edges. In this case, completing the vertex process for one vertex means that the vertex process is completed with respect to three vertices of a triangle, excluding the first two vertices included in the polygon mesh. Therefore, a ratio of the number of executions between the vertex process and the polygon process is approximately 1:1. On the other hand, in a case where a polygon mesh is created by a group of isolated triangles, the polygon process for a triangle is started only after the vertex process is completed for three vertices of the triangle. This means that it is necessary to wait for the vertex process to be completed for three new vertices before starting the polygon process for another triangle. Therefore, a ratio of the number of executions between the vertex process and the polygon process is approximately 3:1. Because of such a difference, the vertex and polygon processes may be performed at unbalanced timings, depending on the shape of a polygon mesh. This results in the processor having idle time.

As described above, when each of the vertex process and the polygon process is performed with use of a different processor, the timings of performing the vertex and polygon processes may become unbalanced, resulting in the processor having idle time. It is especially important for mobile apparatuses such as mobile phones to use processors as efficiently as possible, in terms of reducing space and power consumption. However, idle time as described above wastes computational resource.

Furthermore, a frame rate of rendering is fixed as, for example, 10 fps. Therefore, a set amount of calculation must be performed within a set amount of time. If there is a possibility that a processor has idle time, it is necessary to increase the operation clock frequency, so that the processor can complete the calculation in the time remaining. However, this poses the problem of an increase in power consumption and cost.

The object of the present invention is therefore to provide a processing device in which processors are efficiently used without the above-described unbalance.

Means to Solve the Problems

The above object is fulfilled by a processing device for processing a plurality of polygon meshes that each approximate a three-dimensional object with use of polygonal shapes, wherein each polygon mesh includes a plurality of polygons and processes for each polygon mesh include a coordinate transformation and a gradient calculation, the coordinate transformation being for transforming (i) sets of local coordinates of a plurality of vertices of each polygon mesh into (ii) sets of world coordinates thereof in a world coordinate system, the gradient calculation being for calculating gradients of each polygon mesh based on the sets of world coordinates, and the processing device comprises: a plurality of processors each having a computation unit that performs the coordinate transformation and the gradient calculation; a distribution unit operable to distribute the sets of local coordinates of the polygons of the polygon meshes to the computation units so that each set of the local coordinates is transformed by a different one of the computation units, and cause the computation units to perform the coordinate transformation; an allocation unit operable to allocate each of the polygons, whose sets of local coordinates have been distributed, to a respective one of the computation units that is to perform the gradient calculation; and a supply unit operable to supply a set of world coordinates of each of the polygons to the respective one of the computation units that has been allocated.

Here, the coordinate transformation is the main process of the vertex process, and the gradient calculation is the main process of the polygon process. The coordinate transformation is performed on the sets of local coordinates of the vertices that are defined in a local coordinate system fixed for a corresponding three-dimensional object. The transformed coordinates are the set of world coordinates of each of the vertices that are defined in the world coordinate system representing the virtual space.

Effects of the Invention

With the above-described construction, the processing device causes the plurality of processors to share the vertex process in which computations are performed for each of the vertices constituting a polygon, when rendering a polygon mesh in which a three-dimensional object is modeled. The plurality of processors then share with each other processed vertex data obtained by the above computations. In this way, any processor can perform the polygon process. Since the plurality of processors share the processes, and each of the processors performs the vertex process and the polygon process in series, it is possible to resolve the unbalance of the timing in performing the vertex and polygon processes.

As a result, the processors are unlikely to have idle time, which makes it possible for the processors to give the full performance. Accordingly, even a processor having a low spec, such as a processor mounted on a mobile phone, can continuously render an image without interruption. Since a processor can take longer time in calculation, the processor can operate with a lower clock frequency. This is advantageous in terms of reducing power consumption and cost.

Also, in the processing device of the present invention, the internal construction of each of the plurality of processors is the same. Therefore, the above-described process can be realized by each of the processors running the same program. This makes it possible to expand the program without changing the program, even when changing the number of processors.

Here, the supply unit may have input/output units respectively for the processors, and each of the input/output units may receive sets of world coordinates from a plurality of registers that belong to processors different from a processor including the input/output unit, and transmit the sets of world coordinates to a computation unit that belongs to the processor including the input/output unit.

With the above-described structure, even when transformed coordinates, which are obtained by the vertex process of a computation unit, are stored in a register that belongs to the same processor as a processor in which the vertex process has been performed, the input/output unit reads the transformed coordinates if the transformed coordinates are required for the polygon process of a computation unit that belongs to another processor. In this way, all the computation units of the processors can perform the polygon process after the vertex process in series, thereby suppressing the occurrence of the unbalance of timing in performing the vertex process and the polygon process.

Here, the supply unit may have input/output units respectively for the processors, and each of the input/output units may receive a set of world coordinates that have been transformed by a computation unit that belongs to a same processor as a processor including the input/output unit, and transmit the set of world coordinates to a plurality of registers that belong to processors different from the processor including the input/output unit.

With the above described structure, transformed coordinates obtained by the vertex process of a computation unit are stored in a register that belongs to the same processor as a processor including a computation unit that performs the polygon process using the transformed coordinates. Therefore, all the computation units of the processors can perform the polygon process after the vertex process in series, thereby suppressing the occurrence of the unbalance of timing in performing the vertex process and the polygon process.

Here, the supply unit may have input/output units respectively for the processors, each of the input/output units may receive one of (i) a set of world coordinates that have been transformed by a computation unit that belongs to a same processor as a processor including the input/output unit and (ii) a set of world coordinates from a register that belongs to the same processor as the processor including the input/output unit, and transmit the set of world coordinates to a register that belongs to a processor different from the processor including the input/output unit, and the input/output units in the plurality of processors may be cyclically connected to each other in transmitting and receiving the sets of world coordinates.

After a computation unit has performed the vertex process to obtain transformed vertex coordinates, an input/output unit notifies a computation unit of the transformed vertex coordinates. The computation unit that is notified of the transformed vertex coordinates is in a processor that is different from the processor including the computation unit that has performed the vertex process. Specifically, an input/output unit in a processor notifies an input/output unit in one processor that is adjacent to the processor of transformed vertex coordinates. An input/output unit that belongs to the last processor notifies an input/output unit that belongs to the first processor of the transformed vertex coordinates. In this way, each of the transformed vertex coordinates is notified to a computation unit that belongs to an appropriate processor. Therefore, all the computation units of the processors can perform the polygon process after the vertex process in series, thereby suppressing the occurrence of the unbalance of timing in performing the vertex process and the polygon process. In particular, it is possible to easily deal with a case where transformed vertex coordinates used in the polygon process do not always represent a series of three vertices such as fan data, by selecting transformed vertex coordinates that are to be transmitted to an input/output unit belonging to the adjacent processor and transmitting the transformed vertex coordinates.

Here, the supply unit may include cross-bus switches arranged between (i) output stages of the computation units in the processors and (ii) input stages of registers in the processors. Since the cross-bus is used to transmit and receive processed vertex data between the processors, even if a destination to which the transformed vertex data is transmitted is not fixed to a specific processor, a processor to which the transformed vertex data is transmitted can be changed by controlling the cross-bus.

Here, each of the computation units may perform the gradient calculation immediately after performing the coordinate transformation.

The computation unit of each of the processors starts the polygon process immediately after the vertex process, thereby minimizing wasteful idle time.

Here, the supply unit may include a connection line connecting, in a pair of first and second processors that are adjacent to each other, (i) an output stage of a computation unit in the first processor with (ii) an input stage of a register in the second processor, and a connection line connecting, in a pair of third processor positioned at one end of the plurality of processors and fourth processor positioned at a different end thereof, (i) an output stage of a computation unit in the third processor with (ii) an input stage of a register in the fourth processor.

In the processing device of the present invention, the coordinates of vertices that constitute a polygon mesh are input in a fixed order. Therefore, in a case of, for example, processing a triangle strip, it is determined that a polygon is composed of a series of three vertices. As a result, only the specific processors that have been determined at the design stage may receive and transmit transformed coordinates, thereby eliminating the need of a processor having a complex construction.

Here, the plurality of processors may have a parallel structure in the processing device, and execute a same program. Since having a parallel structure in the processing device, the processors can perform the polygon process in conjunction with each other, while running the same program. Also, it is easy to perform expansion in which the number of processors is increased and decreased, as the program does not depend on the number of processors.

Here, the processing device may be included in a mobile phone, and perform the processes for each polygon mesh in a mobile game.

When the processing device is incorporated into a mobile phone, a graphics rendering process in a mobile game etc. can be performed at high speed.

Here, (i) a program and (ii) information that is related to edges and coordinates of each of the vertices of the polygon meshes may have been downloaded from a network to a memory of the mobile phone.

(i) A program that runs in a processor of the processing device, (ii) vertex data, and (iii) polygon data are downloaded from a network, and recorded in a memory of a mobile phone. Therefore, the mobile phone only needs to execute the downloaded program for the downloaded data, and does not need to perform a modeling process.

Here, the processing device may be notified by a main processor of the mobile phone of (i) an address of a region that has stored therein a program in a memory of the mobile phone, and (ii) information related to edges and coordinates of each of the vertices of the polygon meshes.

The processing device of the present invention is notified, by a CPU therein, of the address of a memory area that stores the program, the vertex data, and the polygon data, thereby achieving high-speed access even with a large amount of data.

Here, the processing device may include a floating-point computation unit, wherein the set of local coordinates of each of the vertices included in the polygon meshes may have been transformed into a set of local coordinates of a float-point type.

Since coordinate data is of a floating-point type, it is possible to prevent a situation where a deformed polygon is rendered due to rounding errors and the like.

Here, each of the computation units may start the process of the coordinate transformation at a different time from each other computation unit.

Since a start time of the coordinate transformation process is different for each processor, it is possible, upon completion of transforming the coordinates of the last vertex among the vertices constituting a polygon, to start the polygon process with use of vertices, other than the last vertex, that have already been transformed.

Here, each of the polygons included in the polygon meshes may be triangular.

It is possible to simplify the polygon process by using a triangular polygon, which is the simplest polygon. Since a ratio of the number of vertices to the number of polygons approximates one, it is possible to suppress the occurrence of the unbalance of timing in performing the vertex process and the polygon process.

Here, each of the computation units may calculate, for a respective one of the polygons included in the polygon meshes, illuminance on edges of a polygon and inside of the polygon, based on illuminance of a plurality of vertices of the polygon.

Each of the computation units calculates illuminance of each of the vertices constituting a polygon, and based on the calculation result, calculates illuminance on the edges and the inside of the polygon. This makes it possible to reproduce a manner in which light falls on a polygon in a virtual space, thereby performing a three-dimensional rendering.

DESCRIPTION OF CHARACTERS

Figure 1:
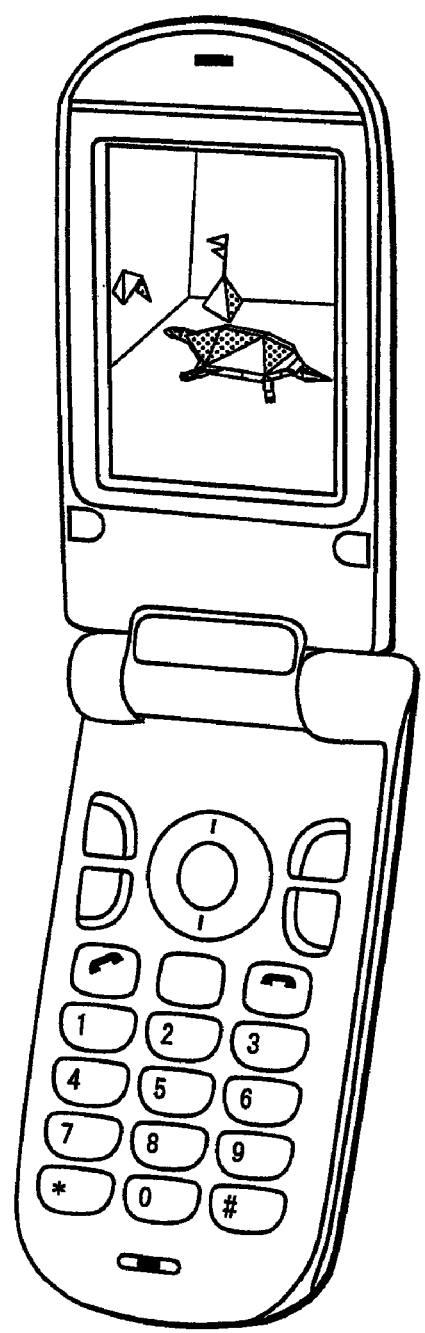
FIG. 1 is an external view showing a mobile phone of the present invention.

100: Processing device
110: CPU
120: Memory
130: Transmission/reception unit
140: Operation input unit
150: Display
200*a*, 200*b*, 200*c*, 200*d*: Processors
210*a*, 210*b*, 210*c*, 210*d*: Registers
210*a'*, 210*b'*, 210*c'*, 210*d'*: Registers
210*a"*, 210*b"*, 210*c"*, 210*d"*: Registers
220*a*, 220*b*, 220*c*, 220*d*: Computation units
230*a*, 230*b*, 230*c*, 230*d*: Input/output units
240: Clock
250: Distribution unit
260: Allocation unit
300: Coordinate transformation unit
310: Viewing transformation unit
320: Illuminance calculation unit
330: Viewport transformation unit
340: Gradient calculation unit
350: Internal region calculation unit

BEST MODE FOR CARRYING OUT THE INVENTION

First Embodiment

A processing device in a first embodiment of the present invention is incorporated in a mobile phone as shown in FIG. 1, and generates setup data that is for rendering projected images of three-dimensional objects on a display, based on a game program and game data that are recorded in a memory.

Here, the three-dimensional objects refer to characters and buildings in a game, and the game data refers to vertex data and polygon data. The vertex data includes coordinates of vertices of polygons when the above three-dimensional objects are modeled with use of the polygons. The polygon data includes information indicating which vertices are connected to create a polygon. Also, the game program includes microcode for calculating setup data from the vertex data and the polygon data. The setup data is a data string in which pixels of a display are in one-to-one correspondence with pixel information pieces that each indicate illuminance etc.

Figure 2:
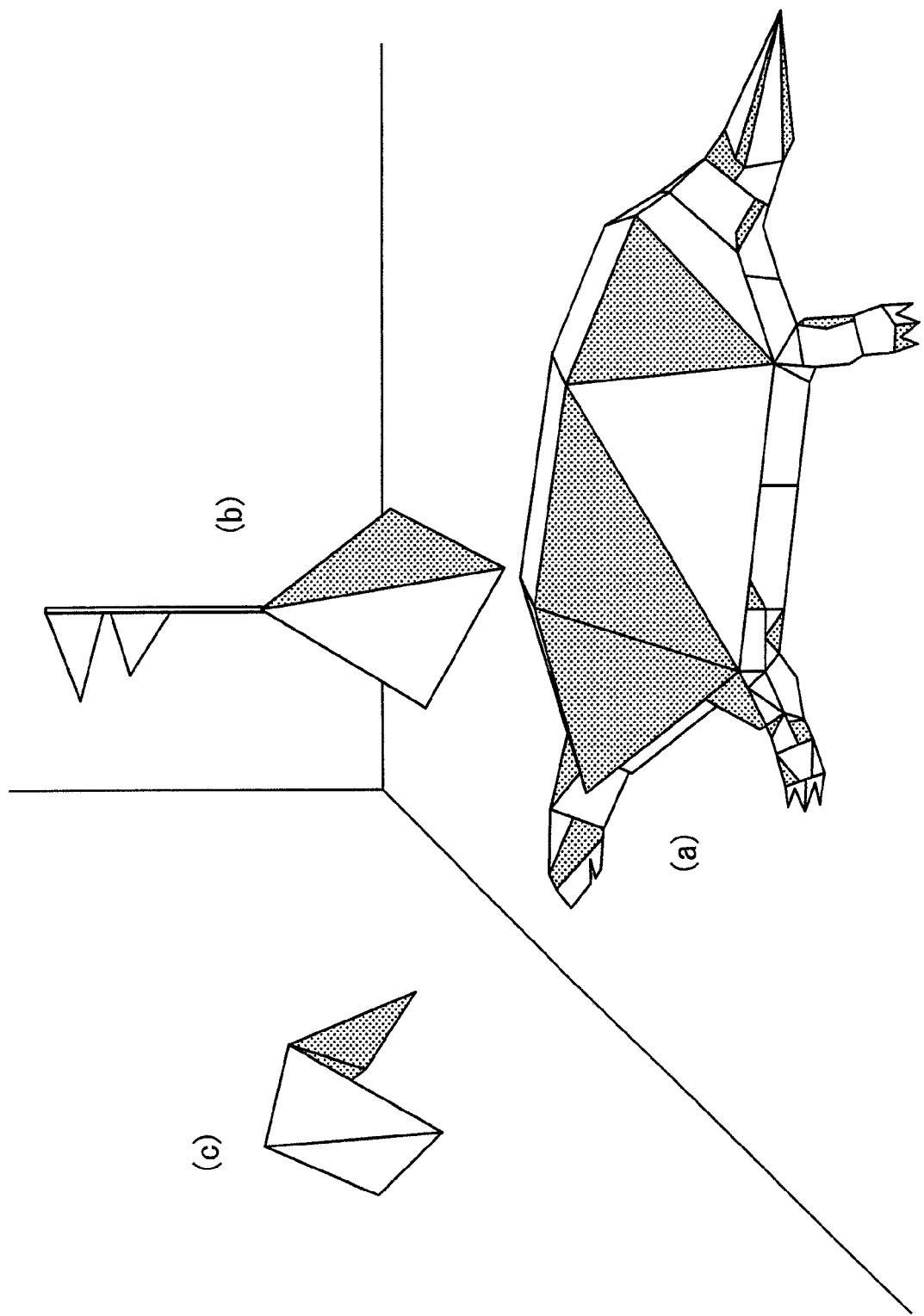
FIG. 2 shows an example of modeling with use of a polygon.

For example, FIG. 2 shows an example of modeling (a) a turtle, (b) a pyramid, and (c) a Λ-shaped object, with use of a triangular polygon. Modeling is performed by a combination of a triangle strip, a triangle fan, and an independent triangle, in a local coordinate system fixed for an object. Although not necessary, triangles are generally used to form a polygon since calculation is easier. The following example is given on the premise that triangles are used for a polygon.

Figure 3A:
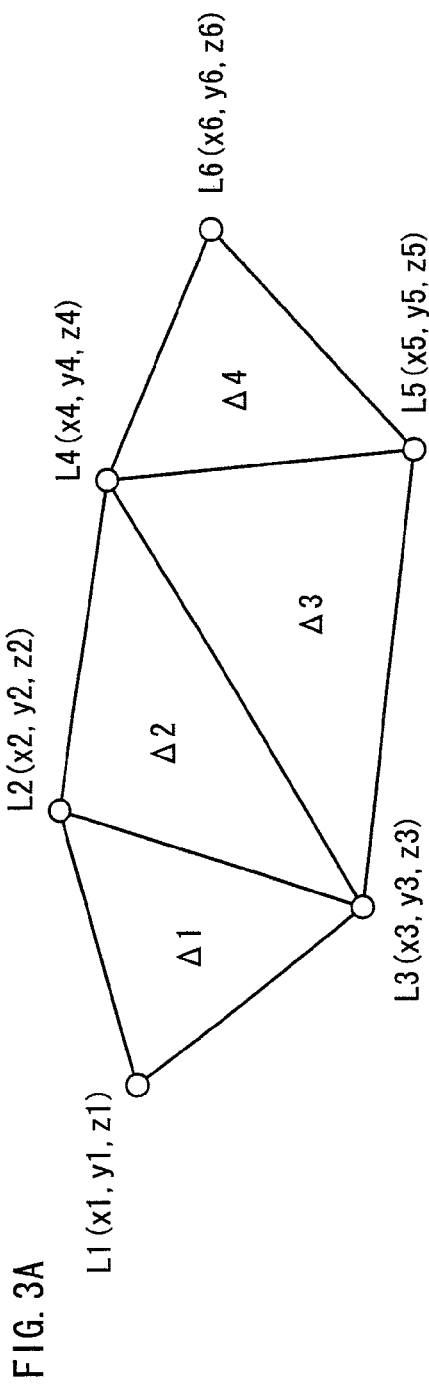
FIG. 3 shows an example of a triangle strip.
Figure 3B:
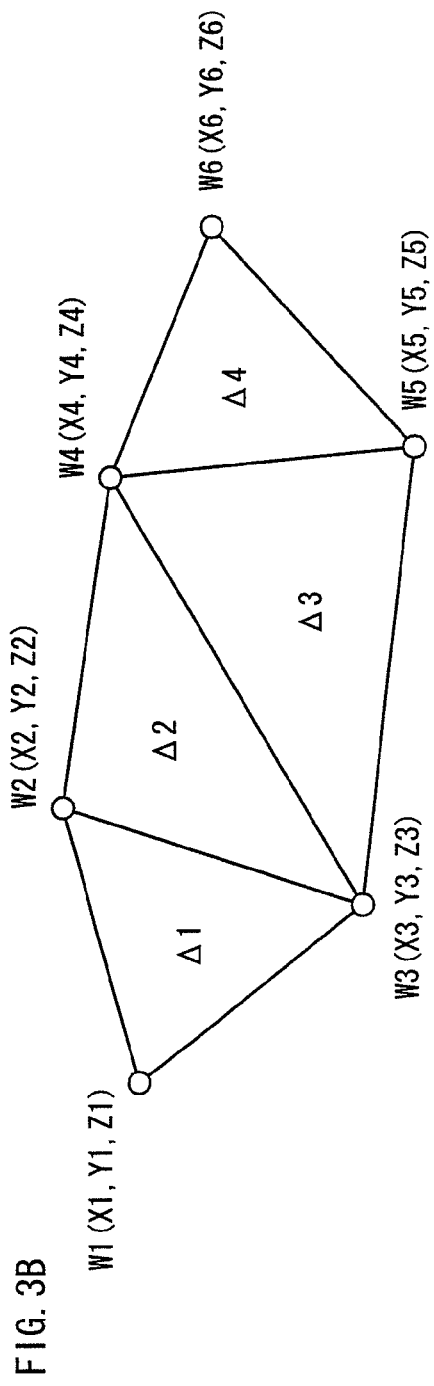

A triangle strip is in a shape of a narrow strip, and is made by a series of triangles sharing edges thereof, as shown in FIG. 3. A triangle strip is used to approximate the turtle shell shown in FIG. 2(*a*). The triangle strip shown in FIG. 3(*a*) is defined by (i) vertex data including local coordinates of six vertices $Li(xi, yi, zi)$ (i=1, 2, 3, 4, 5, 6) and (ii) polygon data indicating that a polygon $\Delta i$ is composed of the vertices Li, L(i+1), L(i+2) (i=1, 2, 3, 4).

Figure 4A:
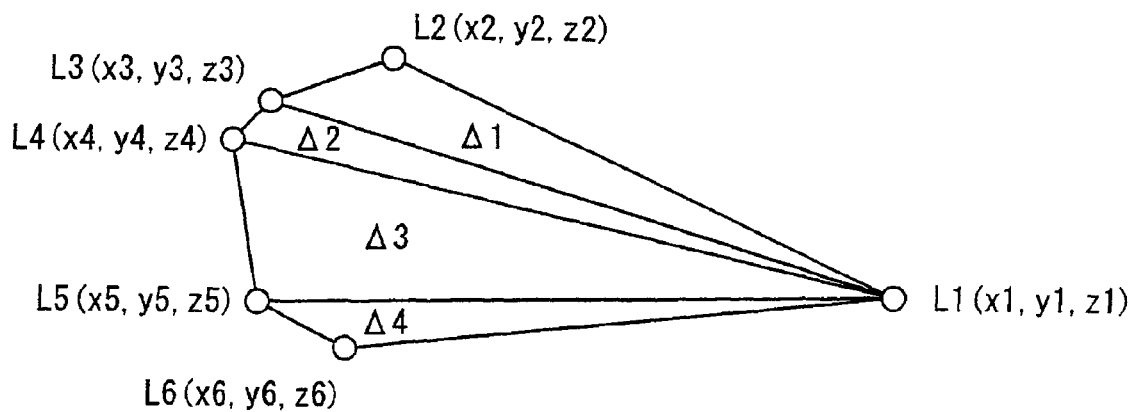
FIG. 4 shows an example of a triangle fan.
Figure 4B:
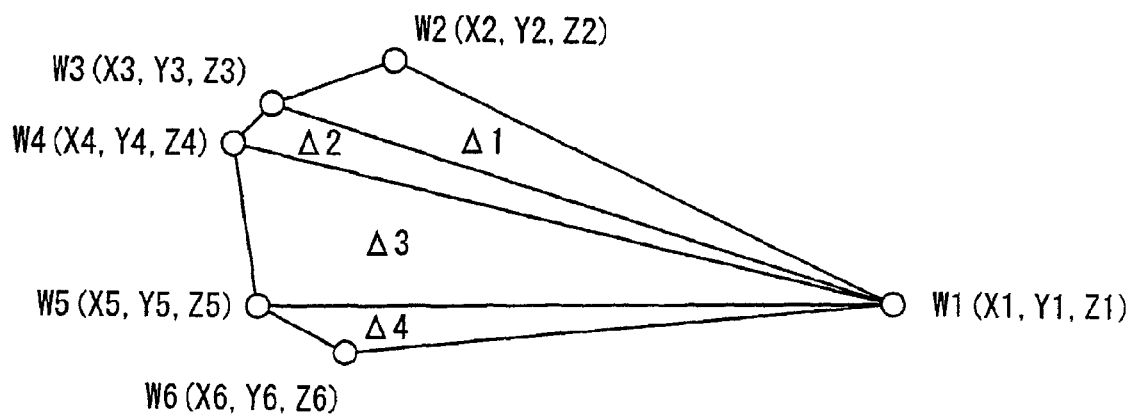

A triangle fan is in a shape of a fan, and is made by a series of triangles sharing edges thereof, as shown in FIG. 4. In FIG. 2(*a*), a triangle fan is used to approximate the tail of the turtle. The triangle fan shown in FIG. 4(*a*) is defined by (i) vertex data including local coordinates of six vertices $Li(xi, yi, zi)$ (i=1, 2, 3, 4, 5, 6) and (ii) polygon data indicating that a polygon $\Delta i$ is composed of the vertices Li, L(i+1), L(i+2) (i=1, 2, 3, 4).

Figure 5A:
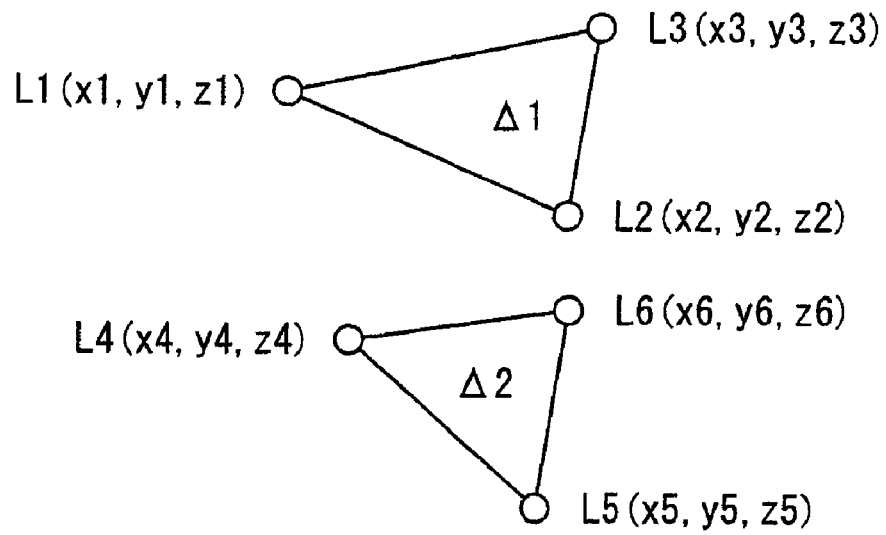
FIG. 5 shows an example of an independent triangle.
Figure 5B:
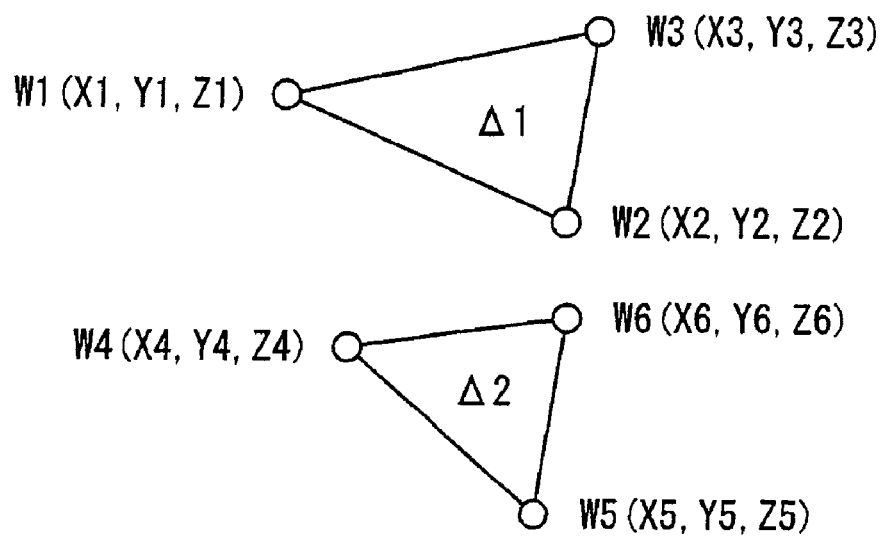

An independent triangle is independent from other triangles, as shown in FIG. 5. In FIG. 2(*b*), an independent triangle is used to approximate a flag standing on the pyramid. The independent triangle shown in FIG. 5(*a*) is defined by (i) vertex data including local coordinates of six vertices $Li(xi, yi, zi)$ (i=1, 2, 3, 4, 5, 6) and (ii) polygon data indicating that a polygon $\Delta i$ is composed of the vertices $L3i-2$, $L3i-1$, $L3i$ (i=1, 2).

As described above, each of the three-dimensional objects is modeled with use of an individual local coordinate system fixed for a target object. Then, a positional relationship of the three-dimensional objects is determined by arranging the three-dimensional objects in a virtual space defined by a world coordinate system. Each of FIG. 3(*b*), FIG. 4(*b*), and FIG. 5(*b*) indicates that local coordinates $Li(xi, yi, zi)$ are transformed into world coordinates $Wi(Xi, Yi, Zi)$.

<Construction of Mobile Phone>

Figure 6:
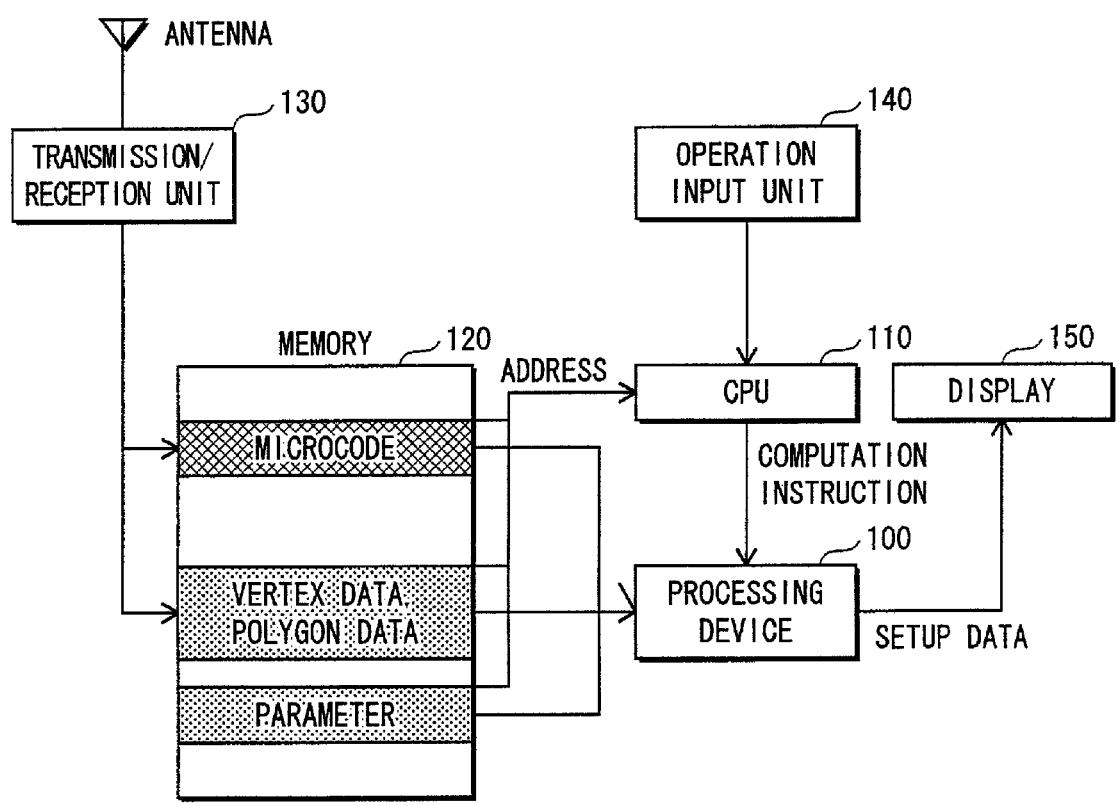
FIG. 6 shows a construction of the mobile phone of the present invention.

FIG. 6 shows a construction of a mobile phone including a processing device 100 in the first embodiment of the present invention. The mobile phone downloads a game program and game data that are distributed via a network. According to an instruction of a user inputted from an operation input unit 140, the game program and game data are received by a transmission/reception unit 130 and stored in a memory 120. When the downloaded game program is executed, a CPU 110 notifies the processing device 100 of (i) microcode for performing a geometry process, (ii) a region that stores vertex data and polygon data that are used for the geometry process, and (iii) the memory address of a region in a memory that stores various parameters necessary for computation. The processing device 100 generates setup data by reading the microcode from the address that has been notified, and executing the microcode for the vertex data and the polygon data that are stored in the memory. The generated setup data is transferred to a display 150 for rendering.

<Construction of Processing Device>

Figure 7:
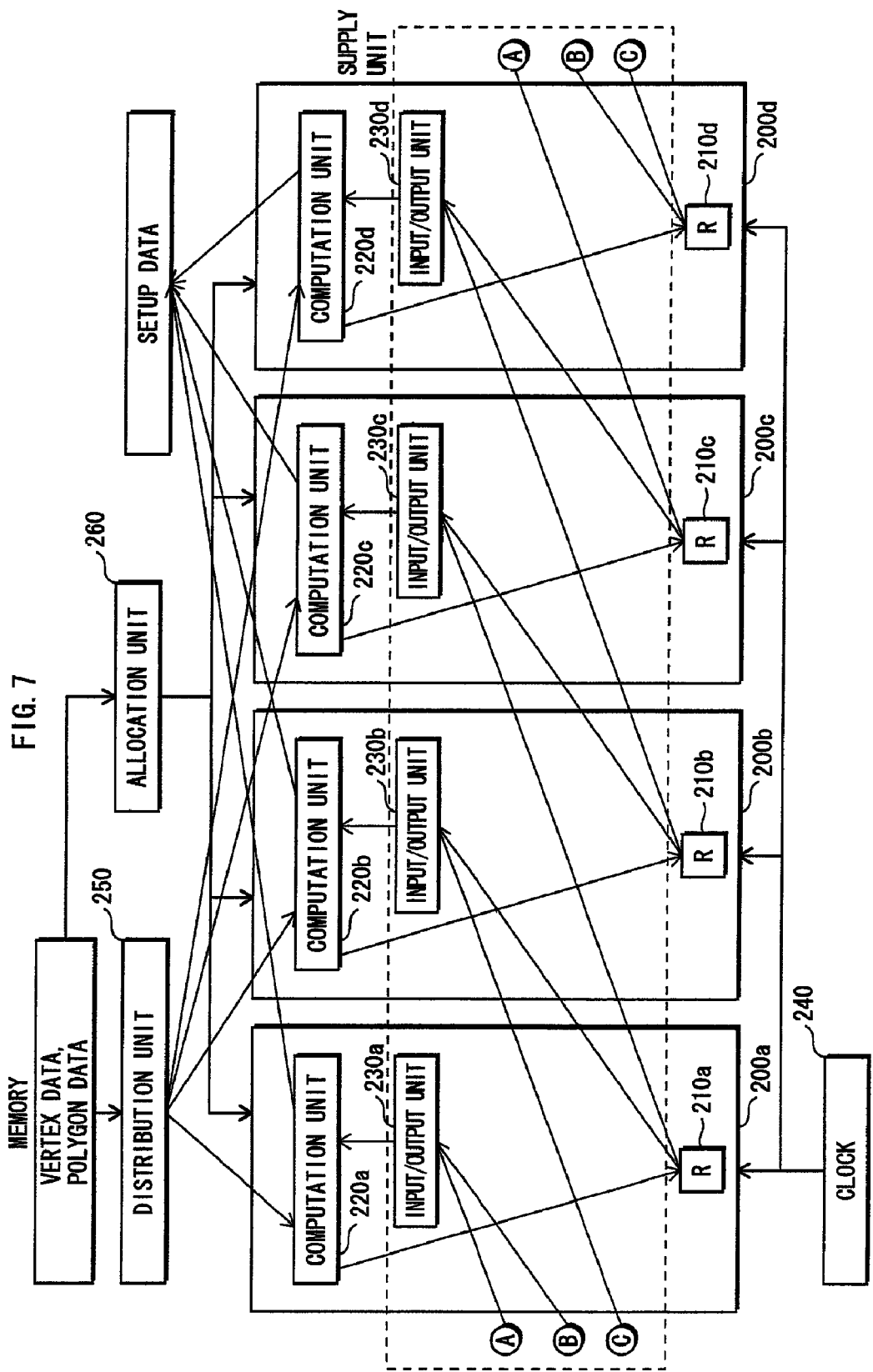
FIG. 7 shows a construction of a processing device in a first embodiment of the present invention.

The following describes a construction of the processing device in the first embodiment of the present invention, with reference to FIG. 7. The processing device in the first embodiment includes: four processors 200*a*, 200*b*, 200*c*, and 200*d*; a clock 240 for driving the processors; a distribution unit 250 for distributing vertex data to each processor; and an allocation unit 260 for allocating a processor that is for executing the polygon process. Each of the processors 200*a*, 200*b*, 200*c*, and 200*d* includes registers 210*a*, 210*b*, 210*c*, and 210*d*, computation units 220*a*, 220*b*, 220*c*, and 220*d*, and input/output units 230*a*, 230*b*, 230*c*, and 230*d*, respectively.

The processing device receives vertex data and polygon data as inputs, sequentially distributes the vertex data pieces to the processors, and outputs setup data obtained as a result of each processor performing the vertex process and the polygon process.

(Distribution Unit 250)

A distribution unit 250 distributes vertices that specify a polygon to each of the processors, so that the processors can perform the coordinate transformation of the vertices in parallel. The vertices that are distributed are represented by the local coordinates, which are transformed into the world coordinates by the coordinate transformation. Given that the number of processors is M, the coordinate transformation is performed with a parallelism M. Here, the distribution means to, for each of the polygons constituting a polygon mesh, read coordinates of the vertices that specify a polygon, associate each of the vertices with a different one of the processors, and deliver the coordinates of each of the read vertices to the respective computation units in the associated processors. Given that the number of vertices that specify a polygon is K, there are three patterns in the distribution of the distribution unit 250 as described below, depending on the relationship between the number of processors M and the number of vertices K.

When M=K, each of the processors can simultaneously transform coordinates of all the vertices of one polygon. In this case, distribution is performed by reading K=M vertices specifying the polygon and simultaneously outputting each of the read vertices to M processors.

When M>K, the processors can transform coordinates of vertices of the next polygon while simultaneously transforming coordinates of all the vertices of the current polygon. In this case, distribution is performed by reading (i) K vertices that constitute the current polygon and (ii) (M−K) out of K vertices that constitute the next polygon, and outputting a total of M vertices respectively to M processors. Note that if K<(M−K), the number of read vertices does not reach (M−K) even after K vertices that constitute the next polygon are all read. Therefore, the distribution unit 250 further reads vertices that constitute polygons after the next polygon unless the last vertex of the polygon mesh has been read, so that a total of M vertices are simultaneously output to the respective processors.

When M<K, the processors cannot simultaneously transform coordinates of all vertices of one polygon. In this case, it is necessary to perform a process of reading M vertices out of K vertices that constitute a polygon, and after transforming the coordinates of the M vertices, reading the remaining (K−M) vertices.

Note that processes performed by the processors after the distribution include the calculation of illuminance etc. as well as the above-described coordinate transformation. In practice, the processors perform the vertex process. Also, the above describes that the vertices are simultaneously output to M processors. However, the vertices read from the memory are sequentially output to the processors. "Simultaneously" as described above means to be "in the same cycle" when one cycle is set to be a cycle that begins when the distribution unit 250 starts reading a total of M vertices from the memory and ends when the distribution unit 250 has finished reading the M vertices.

The distribution unit 250 determines which vertex is to be output to which processor in the following manner. First, the distribution unit 250 sequentially reads, from the memory, each of the vertices for which serial indices are provided, and sequentially outputs the read vertices to each of the processors for which serial indices are provided. When having output the serially-indexed vertices up to the last processor, the distribution unit 250 returns to the first processor to output the vertices.

Figure 8:
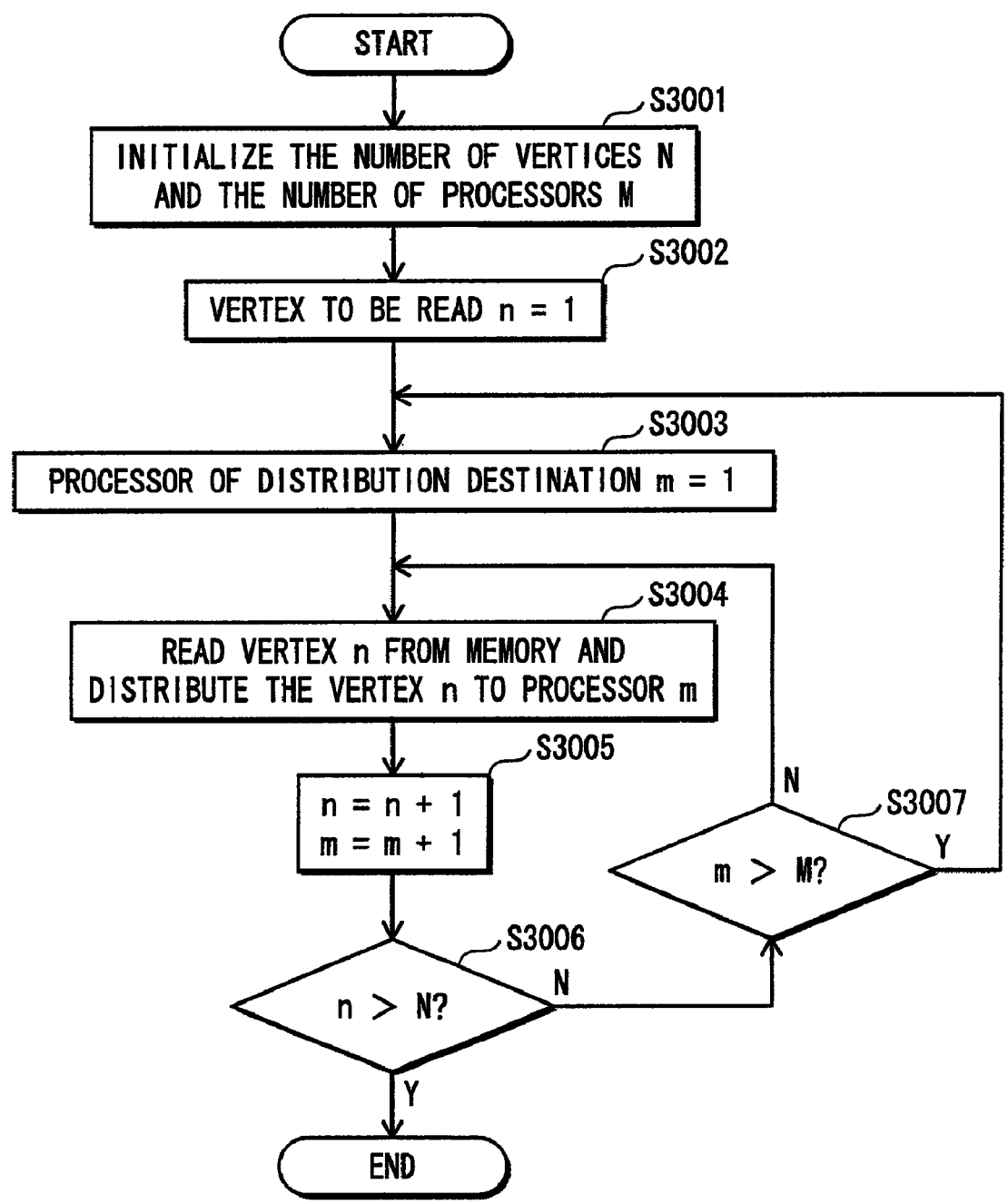
FIG. 8 explains a distribution process of a distribution unit in the processing device, in the first embodiment of the present invention.

The following describes a specific procedure of the above-described distribution process, with reference to the flow chart of FIG. 8. The distribution unit 250 first initializes fixed values N and M. The distribution unit 250 reads polygon data from the memory, and sets the number of vertices of a polygon mesh targeted for a geometry process to N. Also, the distribution unit 250 reads parameters from the memory and sets the number of processors included in the processing device to M (step 3001). In other words, indices from 1 to N are provided for the vertices constituting the polygon mesh, and indices from 1 to M are provided for the processors. The distribution unit 250 initializes the index of a vertex to be read to n=1 (step 3002), and initializes the index of a processor to which a vertex n is distributed to m=1 (step 3003). The distribution unit 250 reads the vertex n from the memory, and distributes the vertex n to a processor m (step 3004). Next, the distribution unit 250 increments the index n indicating a vertex and the index m indicating a processor by 1 (step 3005). When the index n indicating a vertex is larger than the number of all vertices N (step 3006Y), the distribution unit 250 ends the distribution process. When the index n indicating a vertex is not larger than the number of all vertices N (step 3006 N), the distribution unit 250 compares the index m indicating a processor with the number of all processors M. When the index m indicating a processor is larger than the number of all processors M (step 3007Y), the distribution unit 250 returns to the step 3003 to set the index of a processor to which a vertex is distributed to m=1. When the index m indicating a processor is larger than the number of all processors M (step 3007 N), the distribution unit 250 returns to the step 3004 to continue the distribution process.

The distribution unit 250 performs the distribution process as described above. Therefore, when processing a triangle strip as shown in FIG. 3, or an independent triangle as shown in FIG. 5, the distribution unit 250 sequentially distributes vertices L1, L2, L3 and L4 to processors 200a, 200b, 200c, and 200d, respectively. When having distributed the vertices up to the last processor, which is the processor 200d, the distribution unit 250 distributes a subsequent vertex L5 to the processor 200a, which is the first processor.

This concludes a description of the distribution unit 250.

(Allocation Unit 260)

For the gradient calculation of a polygon, the allocation unit 260 allocates the polygon to a computation unit in a processor that is to calculate the gradient of the polygon. Here, the allocation means to select, from among all processors from 1 to M, a processor m that calculates the gradient of a polygon p that is given, and causes the processor m to calculate the gradient of the polygon p. The following describes the reason why such allocation is necessary. First of all, although a parallel calculation with the parallelism M is possible in the coordinate transformation, such parallel calculation is difficult in the gradient calculation. This is because not all vertex coordinates obtained by transforming a plurality of polygons are available at the same time. In this case, it is ideal to allocate the polygon to one of the processors that was originally supposed to perform the coordinate transformation, and thereby cause the processor to perform the gradient calculation. As described above, the allocation unit 260 dynamically determines which processor to perform the gradient calculation, since the gradient calculation is not suitable for the parallel calculation. This allocation process is performed by the following manner. First, an index that is a serial number given to the last vertex among vertices constituting a polygon for which the gradient calculation is to be performed is divided by the number of processors M. Then, the residue obtained by the division is used as a processor number, which is the number of a processor to which a vertex is to be output. In this way, each polygon is processed by a plurality of processors in turn. In the allocation process, shape characteristics that indicate, for example, whether a polygon mesh is a triangle strip is considered, in order to judge whether vertex coordinates distributed to processors in the distribution process are of the last vertex among vertices constituting a polygon.

Note that a process executed by a processor after the above allocation is practically the polygon process, and includes the above gradient calculation, computations of an internal region of a polygon, and such.

Figure 9:
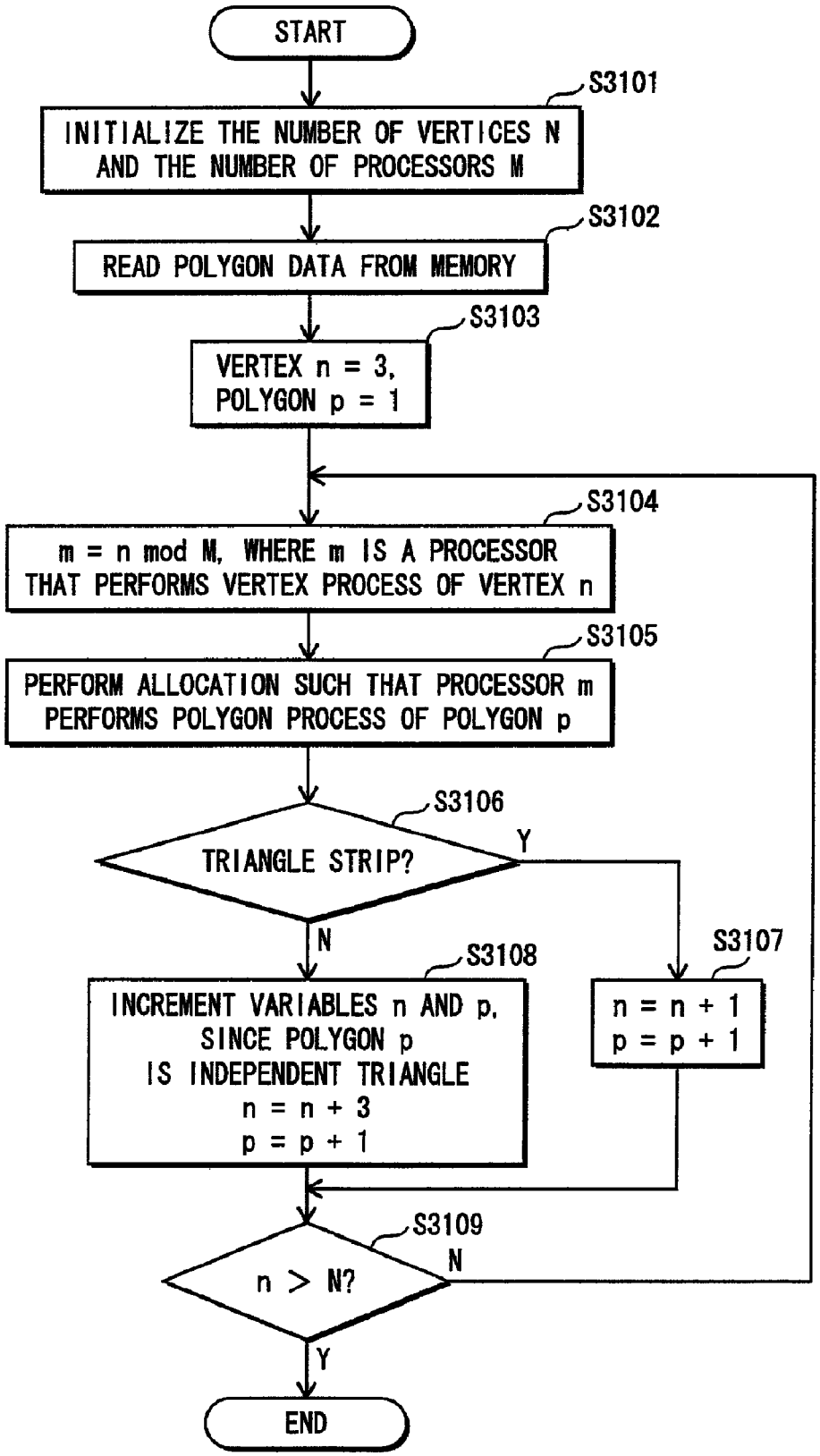
FIG. 9 explains an allocation process of an allocation unit of the processing device, in the first embodiment of the present invention.

The following describes a specific procedure of the above allocation process, with reference to the flow chart of FIG. 9. FIG. 9 shows a process in a case of using a triangular polygon that is often used as a polygon since it is easy to perform computations. The allocation unit 260 first initializes fixed values N and M. Then, the allocation unit 260 reads polygon data from a memory, and sets the number of vertices of a polygon mesh targeted for a geometry process to N. Also, the allocation unit 260 reads a parameter from the memory and sets the number of processors included in the processing device to M (step 3101). The allocation unit 260 further reads polygon data to obtain information related to a kind of a polygon mesh that is being processed (step 3102). The allocation unit 260 initializes the index of a vertex to n=3, and the index of a polygon targeted for the allocation to p=1 (step 3103). Then, the allocation unit 260 calculates an index m indicating a processor that performs a vertex process of the vertex n. Here, the index m is a residue obtained by dividing an index n indicating a vertex by the number of processors M (step 3104). The allocation unit 260 performs allocation such that a processor m performs the polygon process of a polygon p (step 3105). When the kind of the polygon mesh that is being processed is a triangle strip (step 3106Y), the allocation unit 260 increments the index n indicating a vertex by 1, and also increments the index p indicating the polygon targeted for allocation by 1 (step 3107). When a kind of the polygon mesh that is being processed is not a triangle strip (step 3106 N), the polygon mesh that is being processed is considered to be an independent triangle. Therefore, the allocation unit 260 increments the index n indicating a vertex by 3, and increments the index p indicating the polygon targeted for allocation by 1 (step 3108). When the index n indicating a vertex is larger than the number of all vertices N (step 3109 Y), the allocation unit 260 ends the allocation process. When the index n is not larger than the number of all vertices N (step 3109N), the allocation unit 260 returns to step 3104 to continue the allocation process.

The allocation unit 260 performs the allocation process as described above. Therefore, in a case of processing a triangle strip as shown in FIG. 3, the allocation unit 260 performs the allocation process in a manner that the processor 200c for performing the vertex process of a third vertex L3 performs the polygon process of a polygon Δ1 composed of vertices L1, L2, and L3, and that the processor 200d for performing the vertex process of a fourth vertex L4 performs the polygon process of a polygon Δ2 composed of vertices L2, L3, and L4. Also, when processing an independent triangle as shown in FIG. 5, the allocation unit 260 performs the allocation process in a manner that the processor 200c for performing the vertex process of the third vertex L3 performs the polygon process of the polygon Δ1 composed of vertices L1, L2, and L3, and that the processor 200b for performing the vertex process of a sixth vertex L6 performs the polygon process of a polygon Δ2 composed of vertices L4, L5, and L6. This concludes a description of the allocation unit 260.

A computation unit is an ALU (Arithmetic and Logic Unit) that includes a multiplier and an adder. The computation unit performs a vertex process on vertex data distributed by the distribution unit 250 so as to obtain processed vertex data, and outputs the processed vertex data to a register that is in the same processor as the computation unit. Also, in a case of being allocated by the allocation unit 260 to perform the polygon process, the computation unit performs the polygon process on processed vertex data that has been given by an input/output unit that is in the same processor as the computation unit, and outputs setup data.

A register stores processed vertex data on which a vertex process has been performed by a computation unit that is in the same processor as the register.

An input/output unit reads two out of three processed vertex data pieces that are necessary for a computation unit that is in the same processor as the input/output unit to perform the polygon process of a triangular polygon. Here, the two processed vertex data pieces are obtained by the computation units in different processors. Then, the input/output unit reads the two processed vertex data pieces from registers in the different processors, and transfers the two data pieces to the computation unit in the same processor as the input/output unit.

The processing device has vertex data pieces of a triangle polygon mesh regularly input thereto. Therefore, from which input/output unit of a processor each of the input/output units of four processors should acquire processed vertex data is fixed during a designing process of the processing device. As shown in FIG. 7, four processors has a parallel structure, so as to perform the same program. This structure eliminates the need of newly rewriting the program, resulting in the processors easily responding to the change in the number of processors.

The input/output units are arranged in one-to-one correspondence with processors, and each of the input/output units operates independently according to the same program. However, when processed vertex data is transmitted and received between the processors, the entirety of the input/output units and the transmission path operates as a supply unit of the processed vertex data.

<Vertex Process>

Figure 10:
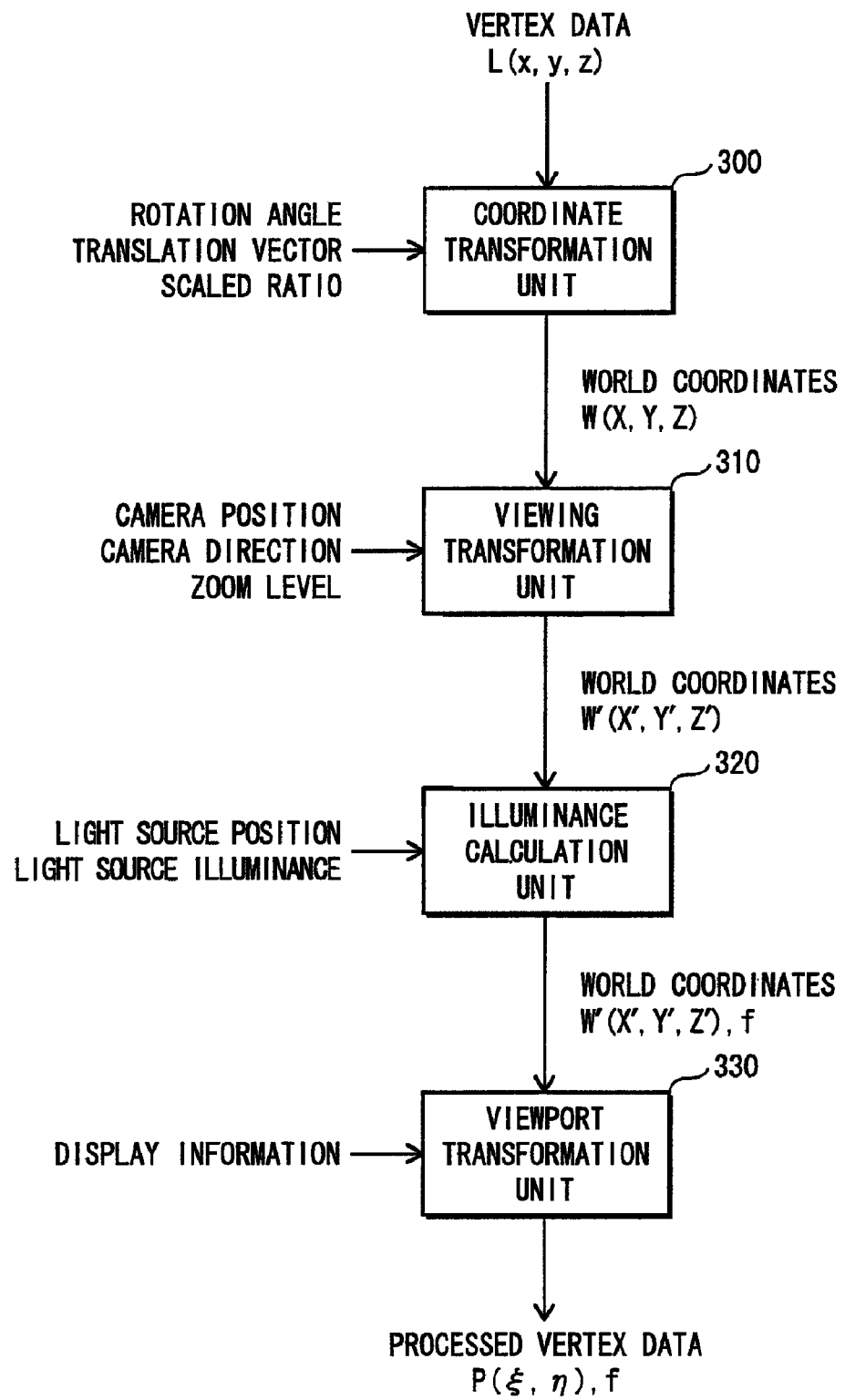
FIG. 10 a flow of an internal process performed during a vertex process.
Figure 11:
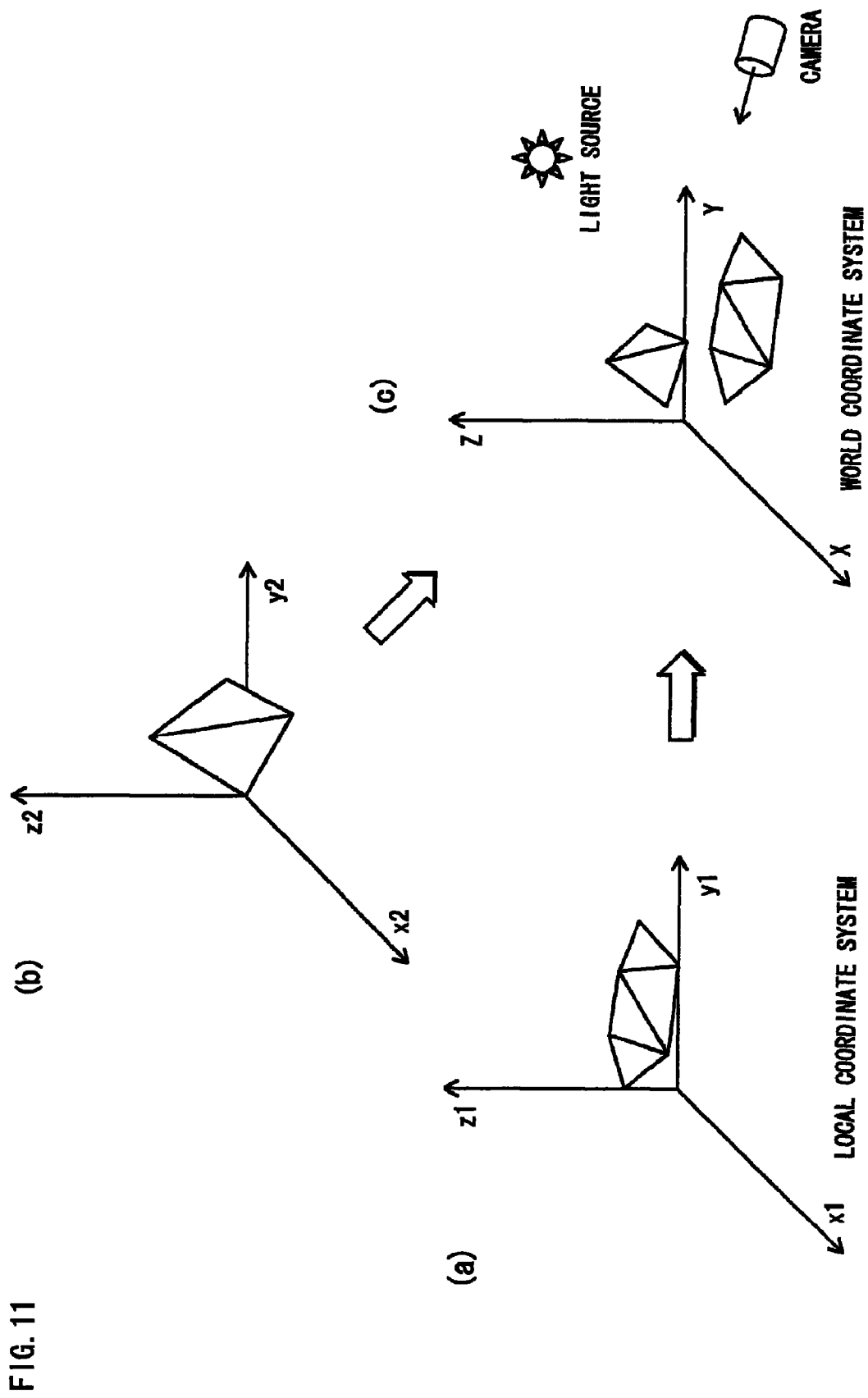
FIG. 11 explains a coordinate transformation in the vertex process.

The following describes the content of the vertex process. FIG. 10 shows a flow of an internal process performed in the vertex process. Upon receipt of vertex data including local coordinates L (x, y, z) of a three-dimensional object that has been modeled, a coordinate transformation unit 300 of a computation unit transforms the vertex data into world coordinates W (x, y, z). This coordinate transformation is a transformation from local coordinate systems to a world coordinate system, when independent three-dimensional objects, for example, (i) a local coordinate system x1y1z1 in which a turtle is modeled as shown in FIG. 11(a) and (ii) a local coordinate system x2y2z2 in which a pyramid is modeled as shown in FIG. 11(b), are arranged in their predetermined positions in one world coordinate system XYZ. In the coordinate transformation, parameters are read from the memory. Such parameters include, for example, (i) a rotation angle specifying a direction of a three-dimensional object, (ii) a translation vector specifying a position thereof, and (iii) a scaled ratio specifying a size thereof.

A viewing transformation unit 310 performs, based on a position of a camera, coordinate transformation to a world coordinates W' (X',Y', Z') in a coordinate system viewed from the camera. A screen for projecting a three-dimensional object is determined by setting a view point to the camera and specifying a direction of the camera, and a zoom level thereof.

An illuminance calculation unit 320 performs calculation of illuminance f of each vertex of a three-dimensional object when light irradiated from a light source position illuminates the object. Although illuminance is taken as an example here, the same process can be applied for other characteristics such as the color of a vertex.

A view port transformation unit 330 reads display information that includes the resolution of a display etc, and projects three-dimensional world coordinates on a screen. As a result, coordinates of a vertex in a three-dimensional virtual space are transformed into two-dimensional screen coordinates P (ξ, η).

As described above, the vertex process is performed by transforming (i) vertex data defined by a local coordinate system into (ii) vertex data that includes information indicating the characteristics of vertices such as two-dimensional coordinates and illuminance. Also, vertex data obtained as a result of performing the vertex process is referred to as processed vertex data. The processed vertex data includes a set of coordinates which is independent of individual local coordinate systems fixed for three-dimensional objects.

<Polygon Process>

The following is a description of the polygon process.

The polygon process is performed when a certain condition is satisfied after a computation unit completes the vertex process. The condition depends on a kind of a polygon mesh and an order of vertices on which the vertex process has been performed. whether to perform the polygon process is judged by referring to the polygon data. The allocation unit judges a kind of polygon mesh that is being processed, by checking the polygon data that includes information indicating the kind of polygon mesh. In a case of processing a triangle strip as shown in FIG. 3, if a vertex on which the vertex process has been performed by the computation unit is either the third vertex or any one of vertices subsequent to the third vertex, the allocation unit gives an instruction for starting the polygon process. In a case of processing an independent triangle as shown in FIG. 5, if a vertex on which the vertex process has been performed by the computation unit is a vertex whose position is given in multiples of 3 in a vertex array of the polygon mesh, the allocation unit gives the instruction for starting the polygon process. At this time, the input/output unit acquires two pieces of processed vertex data corresponding to (i) a vertex located at one position before the vertex processed by the computation unit and (ii) a vertex located at two positions before the vertex processed by the computation unit, in a vertex array of the polygon mesh, and transmits the two pieces of processed vertex data to the computation unit. The computation unit performs the polygon process based on three pieces of processed vertex data, namely the above-described two pieces of processed vertex data and one piece of processed vertex data corresponding to the vertex that the computation unit itself has processed.

It is assumed in the present embodiment that each of the input/output unit only acquires processed vertex data corresponding to (i) a vertex located at one position before or (ii) a vertex located at two positions before in the vertex array, as shown in FIG. 7. Therefore, a triangle fan as shown in FIG. 4 is treated as an independent triangle.

Figure 12:
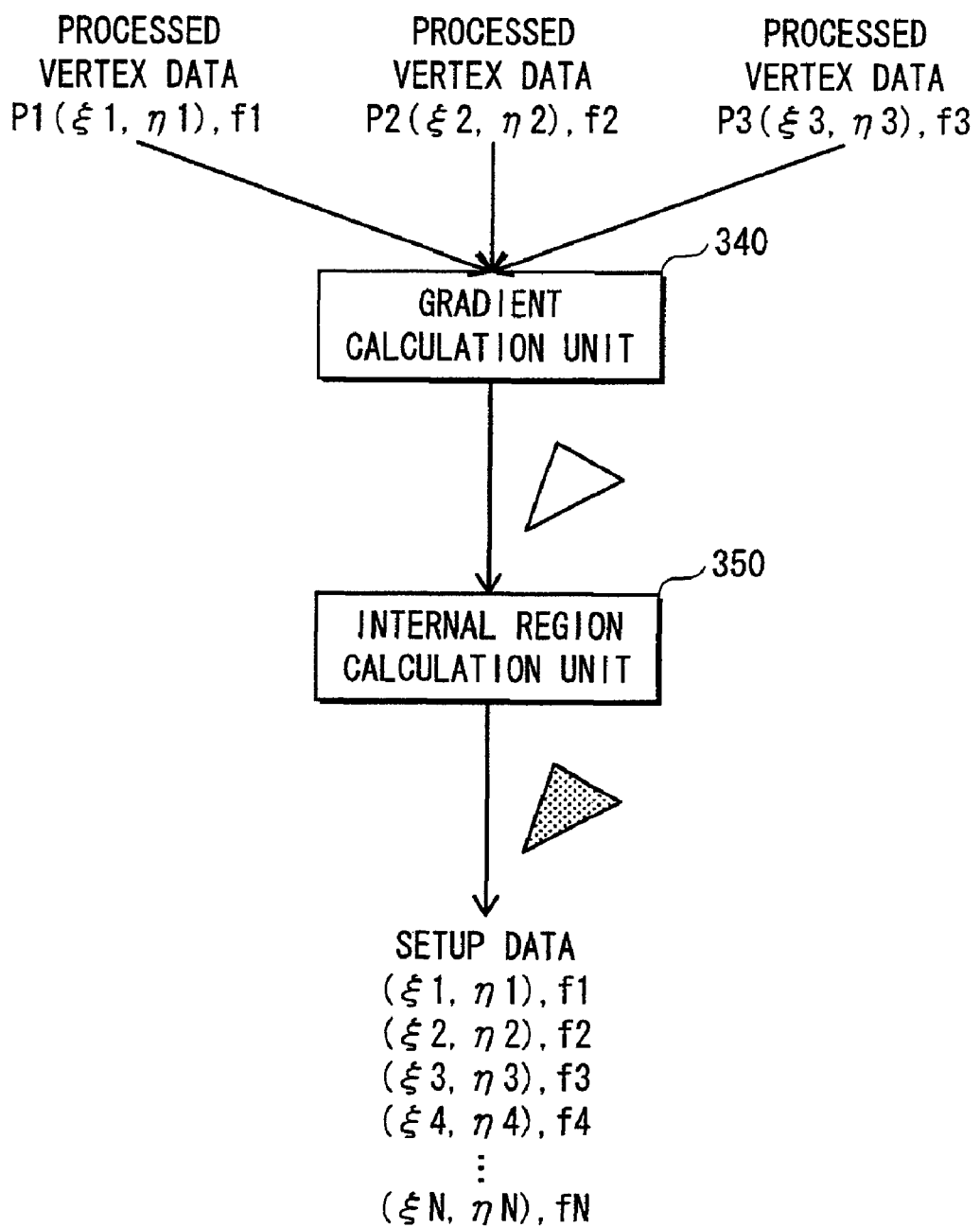
FIG. 12 shows a flow of an internal process performed during a polygon process.

FIG. 12 shows a flow of an internal process performed during the polygon process. As described above, the gradient calculation unit 340 acquires three pieces of processed vertex data obtained by the vertex process. The gradient calculation unit 340 determines a boundary between the inside and outside of a triangular polygon by calculating the gradient of an edge of the triangular polygon that is formed with the three vertices indicated by the three pieces of processed vertex data and that is formed on a screen. Also, the gradient calculation unit 340 calculates illuminance of an edge of the triangular polygon by interpolating illuminance of a vertex of the triangular polygon.

Figure 13A:
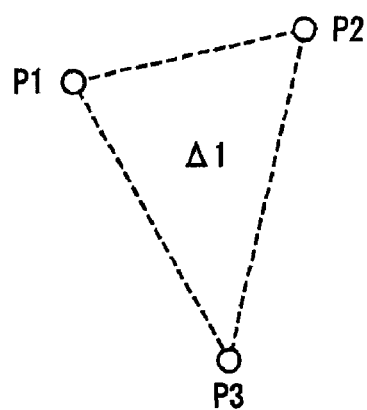
FIG. 13 explains a gradient calculation in the polygon process.
Figure 13B:
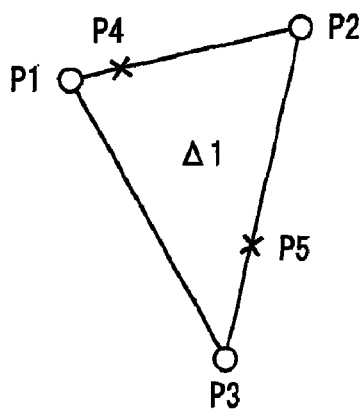
Figure 13C:
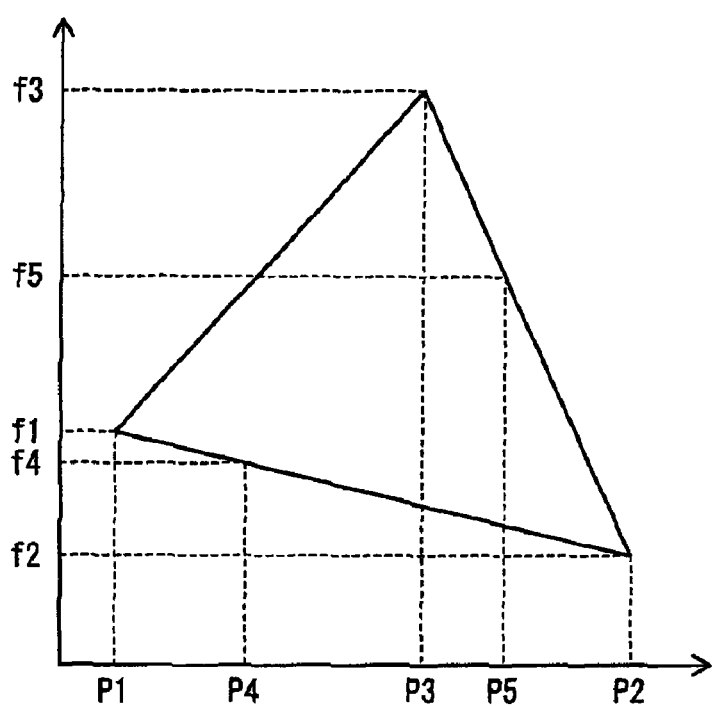

The following describes a case of processing the first polygon Δ1 shown in FIG. 3. FIG. 13(*a*) shows three vertices, namely vertices P1, P2, and P3 of the polygon Δ1 that are projected on a screen. The gradient calculation unit 340 first calculates the gradients of (i) a line segment connecting vertices P1 and P2, (ii) a line segment connecting vertices P2 and P3, and (iii) a line segment connecting vertices P3 and P1, and thereby determines the edges of the triangular polygon, as shown in FIG. 13(*b*). Then, the gradient calculation unit 340 interpolates the illuminance of each point on the edges, based on the illuminance of each of the vertices. FIG. 13(*c*) is a diagram on which (i) the relative positional relationship between vertices is plotted along the horizontal axis and (ii) illuminance is plotted along the vertical axis, when the illuminances of the vertices P1, P2, and P3 are assumed to be f1, f2, and f3, respectively. An illuminance f4 of a point P4 on an edge P1P2 is calculated as a value of a position of the point P4, in a line connecting a point (P1, f1) and a point (P2, f2) in FIG. 13(*c*). In the same manner, an illuminance f5 of a point P5 on an edge P2P3 is calculated as a value of a position of the position P5, in a line connecting a point (P2, f2) and a point (P3, f3) in FIG. 13(*c*).

After the illuminances on the edges of the triangular polygon are calculated as described above, the internal region calculation unit 350 calculates the illuminance of the internal region of the triangular polygon. The illuminances of the points inside the triangular polygon are also calculated by interpolating illuminance of a point on an edge based on the illuminance of a vertex, as seen in a case of calculating the illuminance of a point on an edge.

The inside and edges of the triangular polygon are determined as described above. Here, given that the number of pixels of the inside and edges of the triangular polygon is N, setup data pieces are generated as N combinations of (i) screen coordinates P (E$i$, η$i$) and (ii) illuminance f$i$ ($i$=1, 2, ..., N).

<Operation>

The following describes an operation of the processing device, with reference to FIG. 14. FIG. 14 sequentially shows how the triangle strip shown in FIG. 3 is processed in the processing device in the first embodiment of the present invention. The construction of the processing device is shown in each step shown in FIG. 14, by simplifying the block diagram of FIG. 7. In FIG. 14, (i) ALUs represent the computation units 220*a*, 220*b*, 220*c*, and 220*d*, (ii) Rs represent the registers 210*a*, 210*b*, 210*c*, and 210*d*, and (iii) each combination of the ALU and R respectively corresponds to the processors 200*a*, 200*b*, 200*c*, and 200*c* in the processing device. Note that the input/output units 230*a*, 230*b*, 230*c*, and 230*d* are omitted in FIG. 14. Although not shown in FIG. 14, four processors etc. correspond to a, b, c, and d, starting from the left, as seen in FIG. 7.

FIG. 14(*a*) shows a state of the processing device immediately before starting the process. In FIG. 14(*a*), vertex data pieces L1, L2, ..., L6 are in a state of waiting for the process, in order that each vertex creates the triangle strip. The arrow shows that the vertex data piece L1 is input into the computation unit 220*a* of the processor 200*a*.

In FIG. 14(*b*), the vertex data piece L1 is transformed into processed vertex data piece P1 after being input into the computation unit 220a of the processor 200a for the vertex process. The processed vertex data piece P1 is output to the register 210a of the processor 200a in which the computation unit 220a is located. Then, the next vertex data piece L2 is input into the computation unit 220b of the processor 200b.

Figure 14A:
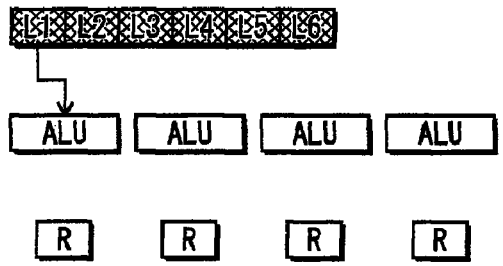
FIG. 14 explains an operation of the processing device in the first embodiment of the present invention.
Figure 14B:
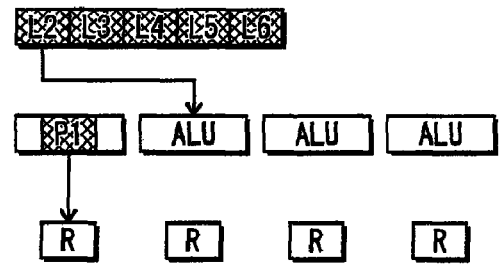
Figure 14C:
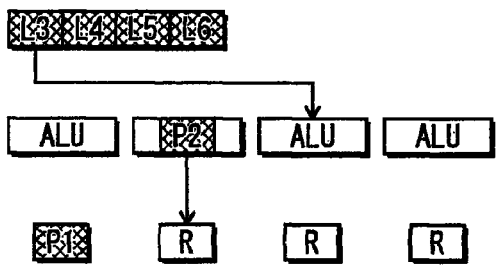

In FIG. 14(c), the vertex data piece L2 is transformed into processed vertex data piece P2 after being input into the computation unit 220b of the processor 200b for the vertex process. The processed vertex data piece P2 is output to the register 210b of the processor 200b in which the computation unit 220b is located. Then, the vertex data piece L3 is input into the computation unit 220c of the processor 200c.

Figure 14D:
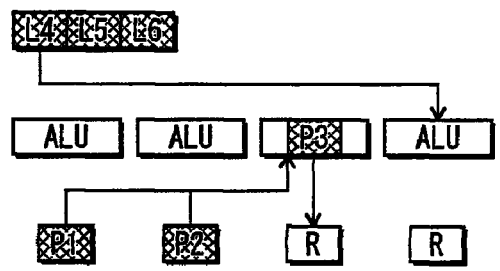

In FIG. 14(d), the vertex data piece L3 is transformed into processed vertex data piece P3 after being input into the computation unit 220c of the processor 200c for the vertex process. At this time, the vertex process for three vertices that constitute the triangular polygon Δ1 is completed. Therefore, the input/output unit 230c of the processor 200c acquires the processed vertex data pieces P1 and P2, from the register 210a of the processor 200a and the register 210b of the processor 200b, respectively. Then, the input/output unit 230c outputs the processed vertex data pieces P1 and P2 to the computation unit 200c of the processor 200c in which the input/output unit 230c is located. Meanwhile, the processed vertex data piece P3 is output to the register 210c of the processor 200c, and the vertex data piece L4 is input into the computation unit 220d of the processor 200d, in the same manner as the previous step described above.

Figure 14E:
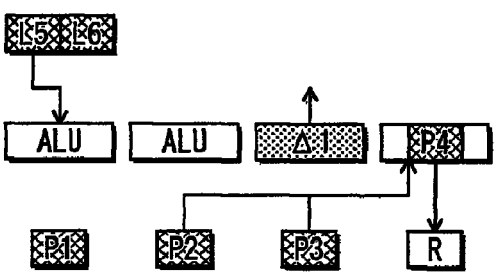

In FIG. 14(e), the computation unit 220c of the processor 200c performs the polygon process with use of the processed vertex data pieces P1, P2, and P3, and outputs a set up data piece related to the triangular polygon Δ1. At this time, the vertex process for three vertices that constitute the triangular polygon Δ2 is completed. Therefore, the input/output unit 230d of the processor 200d acquires the processed vertex data pieces P2 and P3, from the register 210b of the processor 200b and the register 210c of the processor 200c, respectively. Then, the input/output unit 230d outputs the processed vertex data pieces P2 and P3 to the computation unit 220d of the processor 200d in which the input/output unit 230d is located. In this example, the processing device has four processors. Therefore, the subsequent vertex data piece L5 is input into the computation unit 220a of the processor 200a.

Figure 14F:
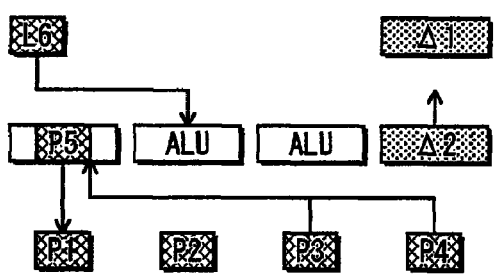

In FIG. 14(f), the computation unit 220d of the processor 200d performs the polygon process with use of the processed vertex data pieces P2, P3, and P4, and outputs a set up data piece related to the triangular polygon Δ2. In the same manner as the previous step described above, the input/output unit 230a of the processor 200a acquires the processed vertex data pieces P3 and P4, from the register 210c of the processor 200c and the register 210d of the processor 200d, respectively. Then, the input/output unit 230a outputs the processed vertex data pieces P3 and P4 to the computation unit 220a of the processor 200a in which the input/output unit 230a is located. A processed vertex data P5 is output to the register 210a of the processor 200a. In this example, the processed vertex data piece P1 that has been stored in the register 210a of the processor 200a is overwritten. The last vertex data piece L6 is input into the computation unit 220b of the processor 200b.

Figure 14G:
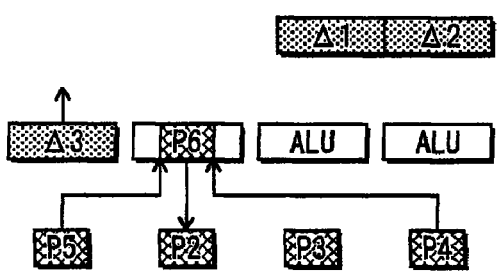

In FIG. 14(g), the computation unit 220a of the processor 200a performs the polygon process with use of the processed vertex data pieces P3, P4, and P5, and outputs a set up data piece related to the triangular polygon Δ3. Also, the input/output unit 230b of the processor 200b acquires the processed vertex data pieces P4 and P5, from the register 210d of the processor 200d and the register 210a of the processor 200a, respectively. Then, the input/output unit 230b outputs the processed vertex data pieces P4 and P5 to the computation unit 220b of the processor 200b in which the input/output unit 230b is located. The processed vertex data piece P6 is output to the register 210b of the processor 200b.

Figure 14H:
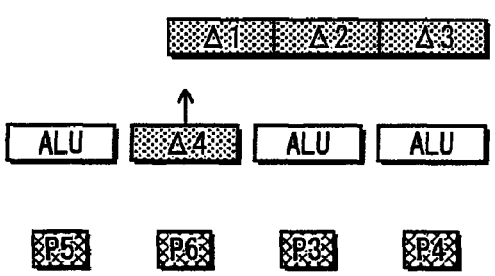

Finally, in FIG. 14(h), the computation unit 220b of the processor 200b performs the polygon process with use of the processed vertex data pieces P4, P5, and P6, and outputs a set up data piece related to the triangular polygon Δ4.

After the geometry process for the triangle strip shown in FIG. 3 is completed as describe above, the processing device outputs the setup data pieces of the triangular polygons Δ1, Δ2, Δ3, and Δ4.

In the description provided above, the processing device only performs the geometry process for one cycle. However, in practice, the processing device may start a process of the first vertex of the triangle strip immediately after completion of the vertex process for the last vertex in the triangle strip.

<Timing Chart>

The following describes when each of the processors 200a, 200b, 200c, and 200d performs the vertex process and the polygon process, in a case where the geometry process is performed as described above, with reference to FIG. 15.

Figure 15:
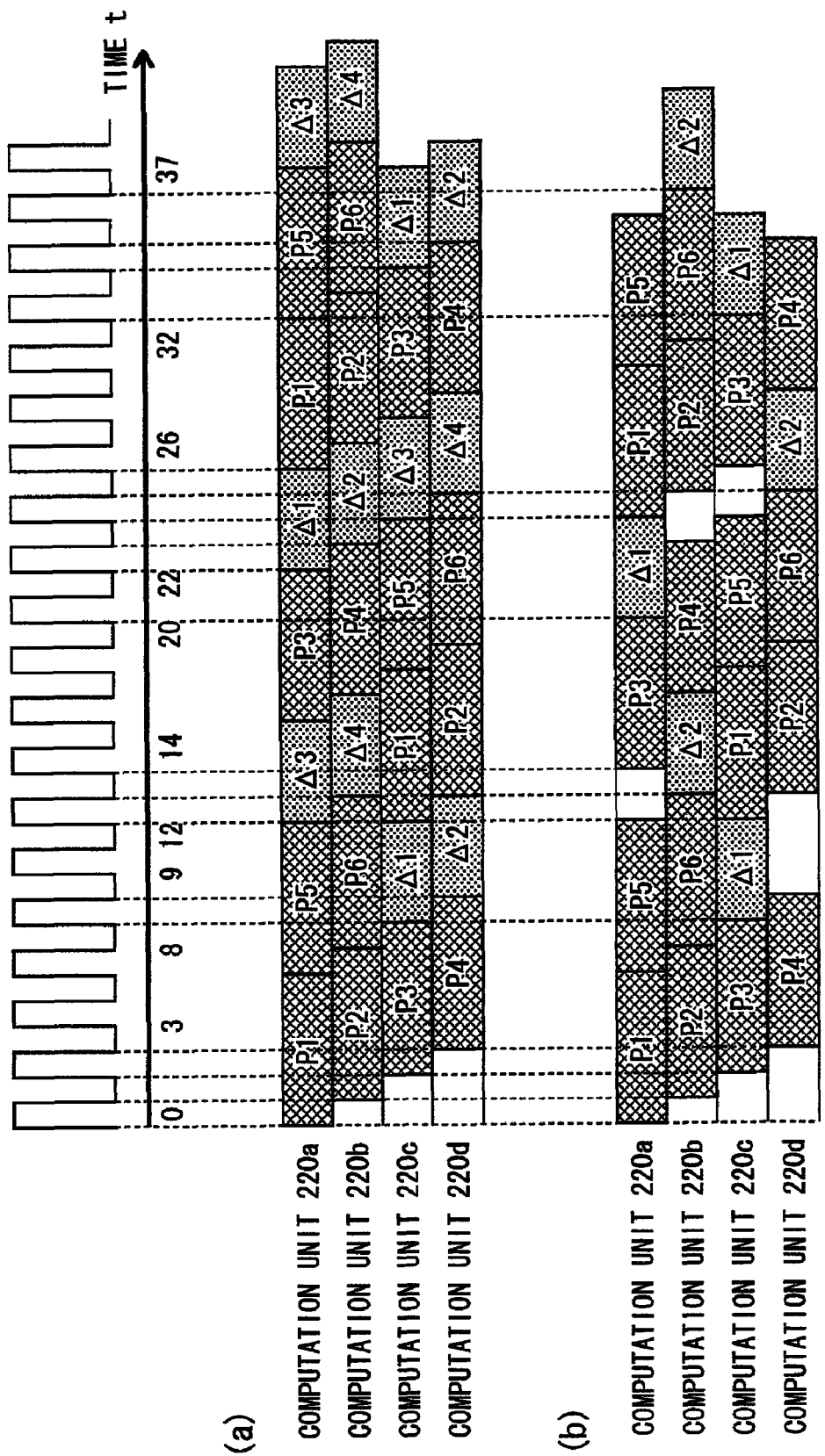
FIG. 15 is a timing chart of the processing device in the first embodiment of the present invention.

FIG. 15 is a timing chart of the processing device in the first embodiment of the present invention. The horizontal axis of the timing chart represents time t, and a clock signal outputted by the clock 240 is shown at the top of FIG. 15. FIG. 15(a) is a timing chart in a case of processing the triangle strip shown in FIG. 3, and FIG. 15(b) is a timing chart in a case of processing the independent triangle shown in FIG. 5.

First, a description is provided of the case of processing the triangle strip shown in FIG. 15(a).

The computation unit 220a starts performing the vertex process on a vertex P1 when time t=0. In this example, it is assumed that the vertex process needs a time period corresponding to three clock cycles. Then, the computation unit 220b starts performing the vertex process on a vertex P2 when the time t=1, which is half a clock later than the start of the vertex process of P1. Subsequently, the computation unit 220c starts the vertex process on a vertex P3 when time the t=2, and the computation unit 220d starts the vertex process on a vertex P4 when the time t=3. Here, it is necessary that the vertex process is completed for three vertices of a triangular polygon, in order to process the triangular polygon. Therefore, the vertex process for a vertex having a larger number starts slightly later than the vertex process for a vertex having a smaller number, so as to guarantee that (i) the vertex process for a vertex immediately before the last vertex and (ii) the vertex process for a vertex immediately before the second last vertex are completed by the time the vertex process for the last vertex is completed.

Although the vertex process for the vertex P1 is completed when the time t=6, the process for obtaining three pieces of processed vertex data that are necessary for starting the polygon process is not completed at this time. Therefore, the computation unit 220a starts the vertex process for a vertex P5. In the same manner, when the vertex process for the vertex P2 is completed at time t=7, the computation unit 220b starts the vertex process for a vertex P6.

By the time the vertex process for the vertex P3 is completed at time t=8, the vertex process for the vertex P1 and the vertex process for P2 have been completed. Therefore, the computation unit 220c starts the polygon process for the triangular polygon Δ1, with use of the pieces of processed vertex data pieces P1, P2, and P3. In this example, the polygon process needs a time period corresponding to two clock cycles.

When the vertex process for the vertex P4 ends at time t=9, the computation unit 220d starts the polygon process for the triangular polygon Δ1 with use of the pieces of processed vertex data pieces P2, P3, and P4.

When (i) the vertex process of the vertex P5 in the computation unit 220a and (ii) the polygon process of the triangular polygon Δ1 in the computation unit 220c are completed at time t=12, the computation unit 220a starts the polygon process of the triangular polygon Δ3 with use of the pieces of processed vertex data pieces P3, P4, and P5, and the computation unit 220c returns to the vertex process of the vertex P1 that is the first vertex of the triangular strip.

In the same manner, when (i) the vertex process of the vertex P6 in the computation unit 220b and (ii) the polygon process of the triangular polygon Δ2 in the computation unit 220d are completed at time t=13, the computation unit 220b starts the polygon process of the triangular polygon Δ4 with use of the pieces of processed vertex data pieces P4, P5, and P6, and the computation unit 220d starts the vertex process of the vertex P2.

As described above, the processing device of the present invention causes the plurality of processors to share the vertex process. Then, every time the calculation of the processed vertex data necessary for the polygon process is completed, the processing device performs the polygon process with a processor that has processed the last vertex of the polygon. This makes it possible to minimize the idle time of the processors, thereby efficiently performing the vertex process and the polygon process in terms of time.

Meanwhile, in a case of processing the independent triangle shown in FIG. 15(b), (i) the first vertex process with respect to the vertices P1 to P6 and (ii) the part in which the computation unit 220c starts the polygon process of the triangular polygon Δ1 at time t=8 are performed in the same manner as in the case of processing the triangle strip shown in FIG. 15(a).

In the independent triangle, the second triangular polygon Δ2 is composed of the vertices P4, P5, and P6. Therefore, the vertex process can start only when the time t=13. The computation unit 220d ends the vertex process of the vertex P4 at time t=9. However, the vertex process of the triangular polygon Δ1 in the computation unit 220c is not complete at time t=9, and the vertex process of the vertex P1 has not started yet. Therefore, the computation unit 220d cannot start the vertex process of the vertex P2. This means that the computation unit 220d has idle time from when the time t=9 to when the time t=12. In the same manner, although completing the vertex process of the vertex P5 at time t=12, the computation unit 220a cannot start the vertex process of the vertex P3, because the vertex process of the vertex P2 in the computation unit 220d has not started yet. This results in the computation unit 220a having idle time from when the time t=12 to when the time t=14.

Because of such reasons, unlike the case of processing the triangle strip, the processors have idle time once in a while in the case of processing the independent triangle as shown by blanks in FIG. 15(b). However, the amount of idle time is within the acceptable range. In conventional techniques, on the other hand, sharing the vertex process and the polygon process among processors causes a problem. That is, (i) if emphasis is laid on the vertex process, processors performing the polygon process cannot keep up with processors performing the vertex process, resulting the processed vertex data being accumulated, and (ii) if emphasis is laid on the polygon process, the processors performing the vertex process cannot keep up with the processors performing the polygon process. Therefore, optimizing the processing device for either one of the triangle strip and the independent triangle deteriorates the usage efficiency of the processors with respect to the other one of the triangle strip and the independent triangle. However, the processing device of the present invention can perform calculation equally efficiently whether a polygon is a triangle strip or an independent triangle.

<Flow Chart>

Figure 16:
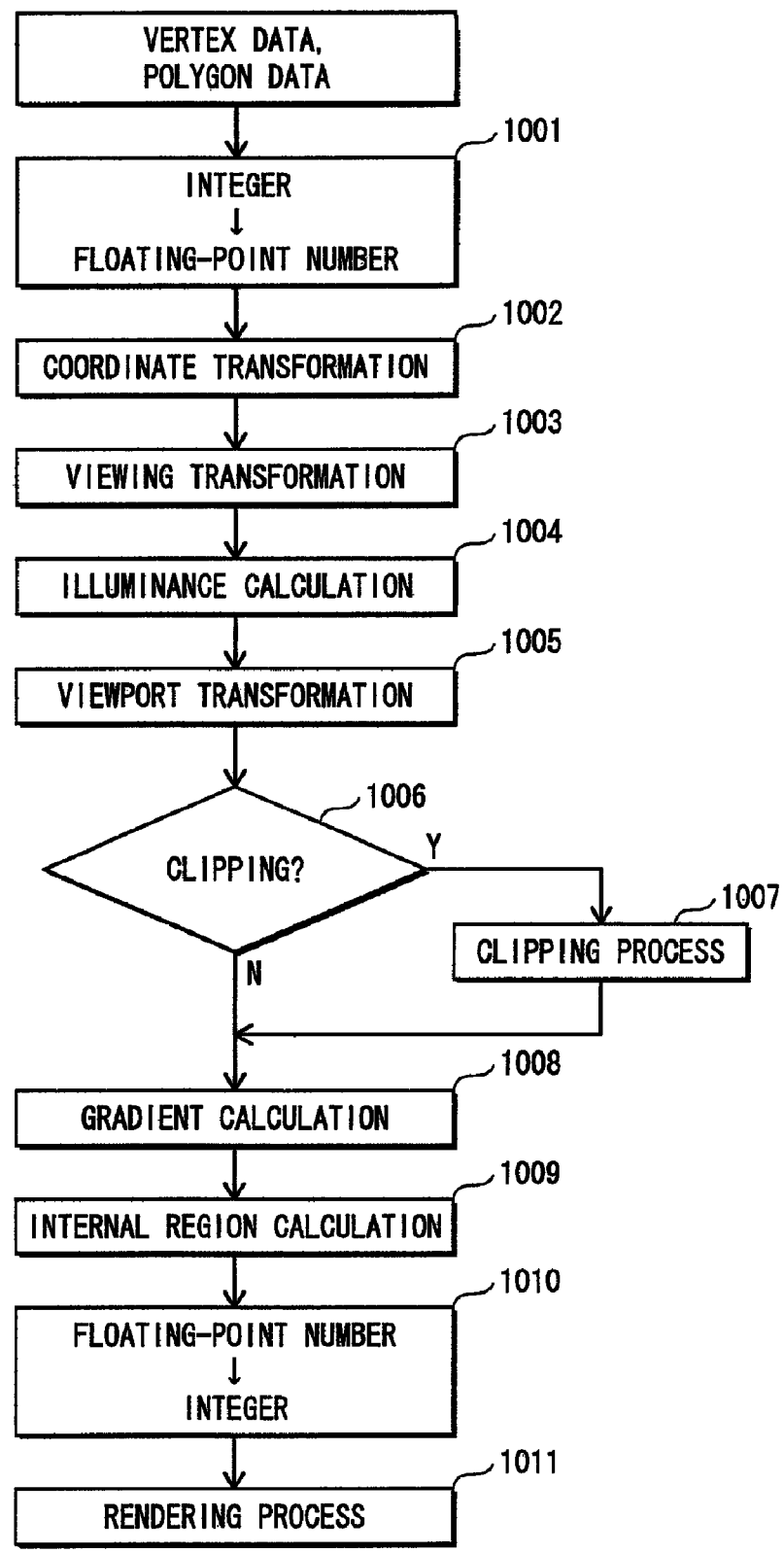
FIG. 16 is a flow chart showing the operation of the processing device in the first embodiment of the present invention.

Finally, FIG. 16 is a flow chart showing the operation of the processing device in the first embodiment of the present invention.

Coordinates in the memory are stored as an integer type. However, if the geometry process is performed with use of the coordinates of the integer type, the coordinates deviate after transformation due to the computation errors, resulting in a deformed polygon being rendered. Therefore, the processing device first transforms the type of the coordinates from the integer type into a floating-point type (step 1001).

As the first step of the vertex process, the processing device transforms the vertex coordinates that have been transformed into the vertex coordinates of the floating-point type, from the local coordinate system into the world coordinate system. Then, the processing device arranges, in one virtual space, the three-dimensional objects that have been individually modeled (step 1002). Furthermore, the processing device transforms the vertex coordinates that have been transformed into the world coordinate system, into a camera-centered coordinate system, and decides the direction and the size of a screen on which the three-dimensional objects are projected (step 1003). Then, the processing device calculates the illuminance of the vertices of the three-dimensional objects (step 1004). As the last step of the vertex process, the processing device performs the viewpoint transformation, so that the vertex coordinates are transformed from the three-dimensional coordinates in the virtual space into two-dimensional coordinates on the plane of the screen (step 1005). At this time, the processing device judges whether or not a clipping process is necessary, in other words, whether or not there are coordinates located outside the screen (step 1006). If judging affirmatively, the processing device performs the clipping process (step 1007).

Then, moving on to the polygon process, the processing device first performs the gradient calculation to determine the borderline of each polygon, and calculates the illuminance on each borderline and such based on the values of the vertices (step 1008). The internal region of a polygon is determined by determining the borderline of the polygon. Therefore, the processing device calculates the illuminance of the internal region and such based on the values of the vertices and the values on the edges (step 1009).

Finally, the processing device transforms the type of coordinates in setup data from the floating-point type into the integer type (step 1010), and renders an image on a display (step 1011).

<Flow Chart of Processes of Each Processor>

Figure 17:
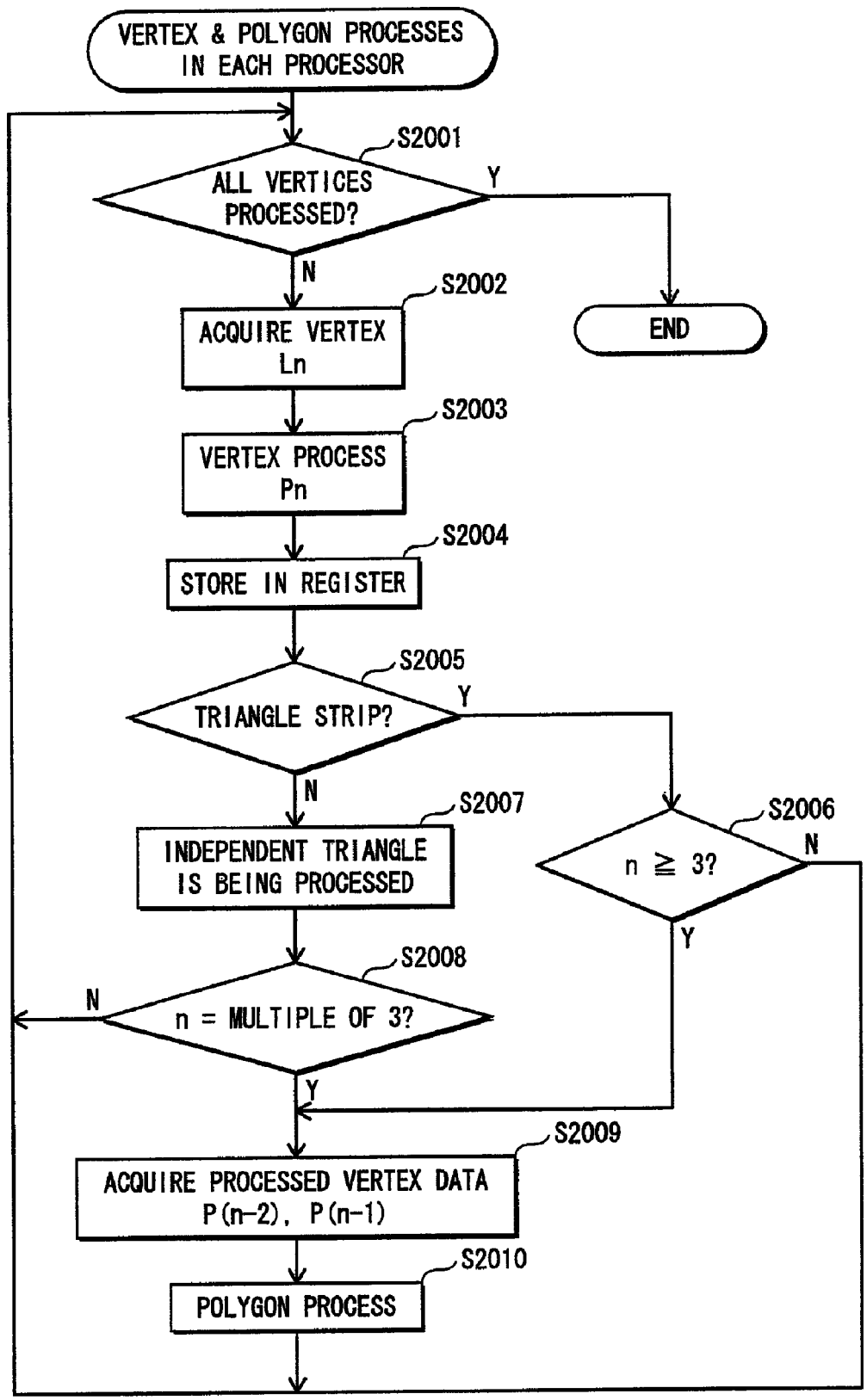
FIG. 17 is a flow chart showing processes of each of the processors in the processing device, in the first embodiment of the present invention.

The following describes the flow of the vertex process and the polygon process in each processor in the processing device, with reference to FIG. 17.

Each processor basically continues to perform the vertex process for each of the vertices that constitute a polygon mesh by acquiring the vertex data, and performs the polygon process by reading the processed vertex data from other processors only when a condition for starting the polygon process is satisfied. The processors continue to perform the above-described processes until the vertex process has been performed on all the vertices that constitute the polygon mesh. The following describes each step of the processes.

First, in step 2001, the processor judges whether or not the vertex process is completed for all the vertices constituting the polygon mesh. If judging affirmatively (step 2001Y), the processor ends the vertex process.

If judging negatively (step 2001 N), the processor acquires a vertex Ln (step 2002). The vertex Ln is a vertex that has not been processed even by the other processors, that has the smallest index, and that includes local coordinates before the coordinate transformation.

Immediately after acquiring the vertex Ln, the computation unit performs the vertex process so as to calculate processed vertex data piece Pn (step 2003). The computation unit stores the processed vertex data piece Pn that has been calculated, in a register in a processor including the computation unit (step 2004).

Subsequently, the allocation unit determines whether or not the computation unit performs the polygon process. If a polygon mesh that is being processed is a triangle strip (step 2005Y), and (i) when the index n of the processed vertex is 3 or more (step 2006Y), the process moves on to step 2009, and (ii) when the index n of the processed vertex is less than 3 (step 2006N), the process returns to step 2001. When a polygon mesh that is being processed is not a triangle strip (step 2005N), the polygon mesh is considered as an independent triangle (step 2007). In this case, if the index n is a multiple of 3 (step 2008Y), the process moves on to step 2009. If the index n is not a multiple of 3 (step 2008N), the process returns to step 2001.

In step 2009, the input/output unit acquires, from the other processors, processed vertex data piece P(n−2) that corresponds to a vertex located at two positions before the processed vertex Pn, and processed vertex data piece P(n−1) that corresponds to a vertex located a tone position before the processed vertex Pn, and transmits the processed vertex data pieces P(n−2) and P(n−1) to the computation unit.

The computation unit performs the polygon process with use of (i) the processed vertex data pieces P(n−2) and P(n−1) that have been obtained from the input/output unit and (ii) the processed vertex data piece Pn that the computation unit itself has processed (step 2010). When the setup data has been calculated in the polygon process, the process returns to step 2001. The above-described process is repeated until the vertex process is completed with respect to all the vertices that constitute the polygon mesh.

<Clipping Process>

Figure 18A:
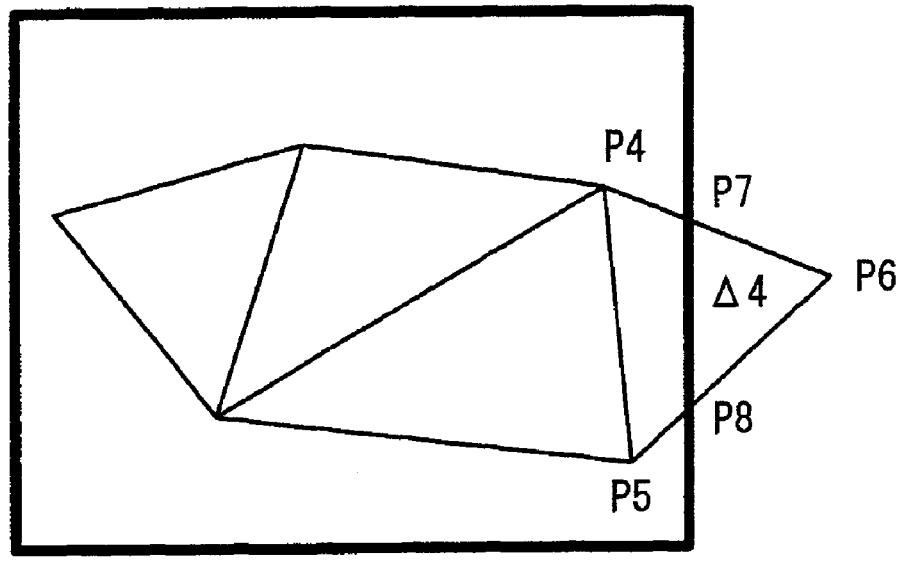
FIG. 18 explains a clipping process.
Figure 18B:
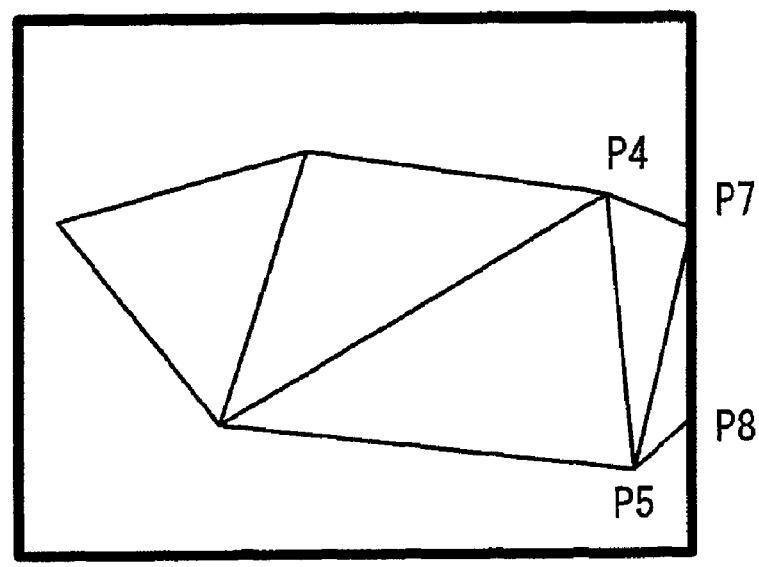

The following describes a clipping process. In the clipping process, when part of an image of a three-dimensional object that is projected on a screen is off the screen, the part that is off the screen is cut so as to restructure the polygon mesh. The part that is off the screen does not need to be rendered on a display. Therefore, the clipping process eliminates unnecessary polygon process being performed. For example, given that FIG. 18(*a*) shows an image of the triangle strip on FIG. 3 that is projected on the screen. In FIG. 18(*a*), part of the triangular polygon Δ4 that is composed of the vertices P4, P5, and P6 in FIG. 18(*a*) is off the screen. In this case, intersection points of (i) the triangular polygon Δ4 having the off-screen part and (ii) the screen frame are calculated, as shown by the points P7 and P8 in FIG. 18(*a*). Then, as shown in FIG. 18(*b*), the triangular polygons are restructured with the points P4, P5, P7, and P8 that are on the screen as vertices. The illuminance and such of the intersection points P7 and P8 are calculated with use of interpolation between vertices, in the same manner shown in the polygon process.

<Front/Back Judgment and Back-Face Culling>

The steps of (i) the judgment of the clipping and (ii) the clipping process shown in FIG. 16 may be replaced with other processes as long as the processes can be performed only after the vertex process has been performed on the three vertices constituting a triangular polygon. For example, such processes include back-face culling. The back-face culling is a process for selecting, from triangular polygons constituting a projected image of a three-dimensional object on a screen, a triangular polygon that has been judged to be facing backward in the front/back judgment, and removing the selected triangular polygon from a target for rendering.

Figure 19A:
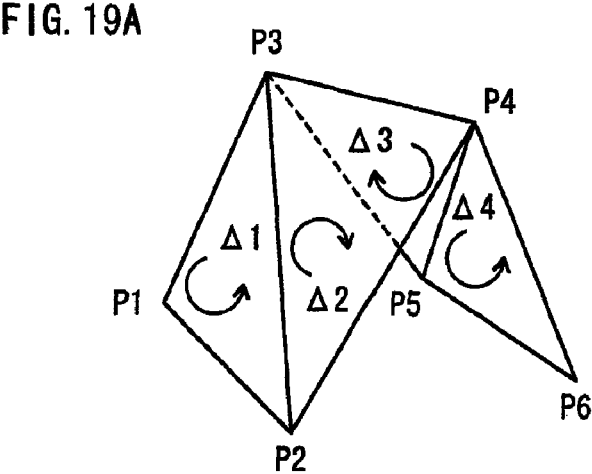
FIG. 19 explains a front/back judgment and back-face culling.
Figure 19B:
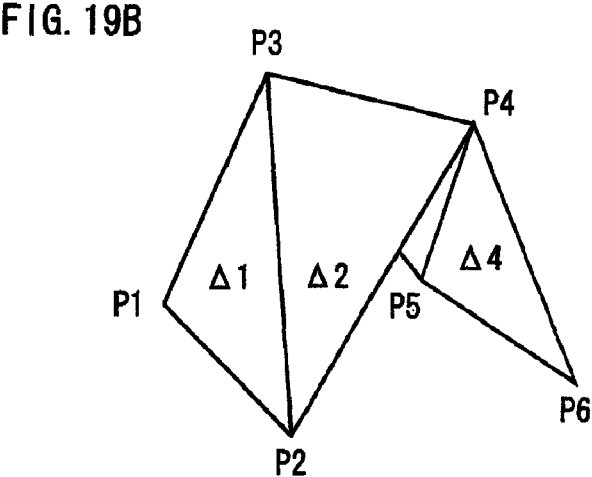
Figure 19C:
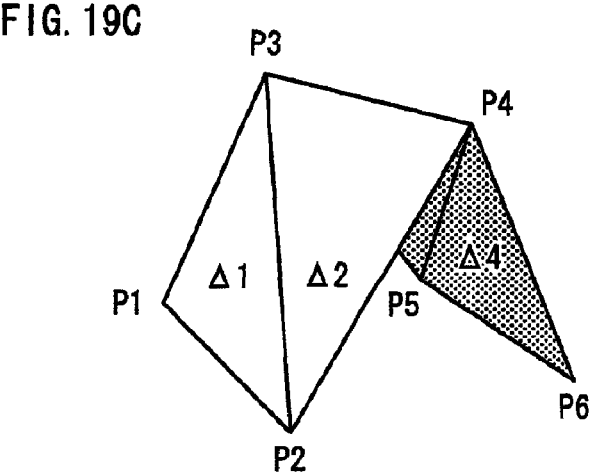

When a Λ-shaped object as shown in FIG. 2(*c*) is projected on a screen, the backside of the triangular polygons can be seen as shown in FIG. 19(*a*). In this case, a front/back judgment is performed on a polygon by using the vertex coordinates to judge whether the polygon faces frontward or backward. Specifically, the front/back judgment is performed based on a relationship between an order of the vertices Pi(i=1, 2, ..., 6) of a triangle strip as shown in FIG. 19(*a*) and an alignment thereof on the plane of a screen. In other words, the vertices P1, P2, and P3 of the triangular polygon Δ1 in FIG. 19(*a*) are aligned in counterclockwise, as shown by the arrow. As with a triangular polygon located in an odd-number position in the triangle strip, the triangular polygon is defined to be facing frontward when the vertices of the triangular polygon are aligned in counterclockwise. At this time, the vertices P2, P3, and P4 of the next triangle polygon Δ2 are aligned in clockwise as shown by the arrow, because of its nature as a triangle strip. Therefore, as with a triangular polygon located in an even-number position in the triangle strip, the triangular polygon is defined to be facing frontward when the vertices of the triangular polygon are aligned in clockwise. Accordingly, the triangular polygon Δ3 having the vertices P3, P4, and P5 is judged to be facing backward, since the triangular polygon Δ3 is located in an odd-number position and the vertices P3, P4, and P5 are aligned in clockwise. Also, the triangular polygon Δ4 having the vertices P4, P5, and P6 is judged to be facing backward, since the triangular polygon Δ4 is located in an even-number position and the vertices P4, P5, and P6 are aligned in counterclockwise. This concludes a description of the front/back judgment.

Whether to perform the back-face culling is set for each three-dimensional object. When the back-face culling is not performed, the back side of the object is rendered as well as the front side thereof as shown in FIG. 19(*b*). When the back-face culling is performed, the back side of the object is not rendered as shown by the shade in FIG. 19(*c*). When the back-face culling is performed on a three-dimensional object, a projected image of the object becomes imperfect since the back side of the object is not rendered. However, the back-face culling is effective for speeding up the rendering process since the amounts of calculation and rendering decrease.

Second Embodiment

In a second embodiment of the present invention, a description is provided of an example in which the structure of a plurality of processors in a processing device is different from the structure thereof in the first embodiment. In the first embodiment, (i) a computation unit that has performed a vertex process to obtain processed vertex data and (ii) a register that stores the processed vertex data belong to the same processor, and an input/output unit of another processor acquires the processed vertex data from the register of the processor. In the second embodiment, processed vertex data, which is obtained by a computation unit performing a vertex process on vertex data, is transmitted to an input/output unit. Then, the input/output unit transmits the processed vertex data to registers in other processors.

<Construction>

Figure 20:
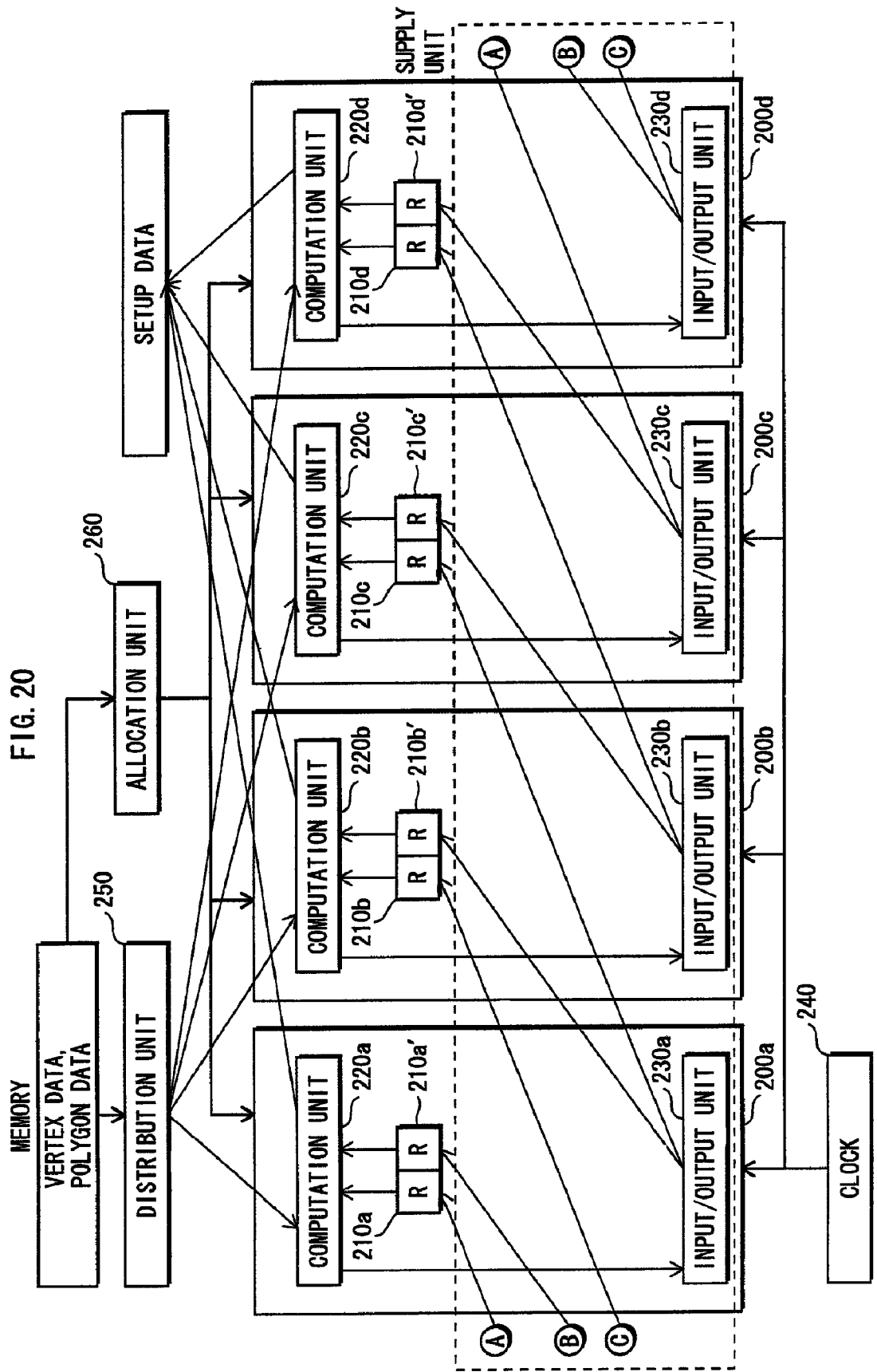
FIG. 20 shows a construction of a processing device in a second embodiment of the present invention.

FIG. 20 shows a construction of a processing device in the second embodiment of the present invention. The processing device in the second embodiment includes the four processors 200a, 200b, 200c, and 200d, the clock 240 for driving the processors 200a to 200d, the distribution unit 250 for distributing vertex data to each processor, and the allocation unit 260 for allocating a processor that performs the polygon process. The second embodiment is the same as the first embodiment on the point that each of the processors 200a, 200b, 200c, and 200d include the register 210a, 210b, 210c, and 210d, the computation unit 220a, 220b, 220c, and 220d, and the input/output units 230a, 230b, 230c, and 230d, respectively. However, the processors included in the processing device of the second embodiment further includes registers 210a', 210b', 210c', and 210d', respectively, which means that each processor has two registers. Also, the second embodiment is different from the first embodiment in terms of a method in which the input/output units transmit and receive the processed vertex data.

As shown in FIG. 20, an input/output unit in a processor transmits processed vertex data that is obtained by a computation unit performing a vertex process in the same processor, to registers that are respectively included in two different processors. This makes it possible for a computation unit to perform the polygon process with use of processed vertex data that is obtained by a processor other than a processor having the computation unit performing a vertex process.

A register stores the processed vertex data transmitted by the input/output unit.

After performing a vertex process on vertex data that has been given, a computation unit in a processor performs the polygon process for a triangular polygon, with use of three pieces of processed vertex data, namely a piece of processed vertex data obtained by the vertex process, and two pieces of processed vertex data that are respectively saved in two registers in the same processor as the one corresponding to the computation unit.

<Operation>

The following describes the operation of the processing device according to the second embodiment of the present invention, with respect to FIG. 21. FIG. 21 shows an example of a case where the processing device of the second embodiment processes the triangle strip shown in FIG. 3, in the same manner as FIG. 14. In FIG. 21, ALUs represent the computation units 220a, 220b, 220c, and 220d, and Rs represent the registers 210a, 210a', 210b, 210b', 210c, 210c', 210d, and 210d'. The processing device of the second embodiment includes four processors that are each shown by a combination of one computation unit and two registers. Although not shown in FIG. 21, four processors, etc. correspond to a, b, c, and d, starting from the left, in the same manner as FIG. 20. Also, two registers in each processor respectively correspond to, for example, a, a', starting from the left.

Figure 21A:
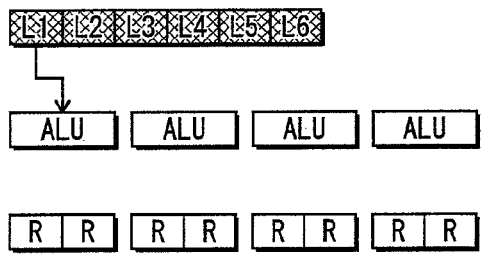
FIG. 21 explains an operation of the processing device in the second embodiment of the present invention.

FIG. 21(a) shows a state immediately before vertex data and polygon data are input into the processing device. In FIG. 21(a), vertex data L1 is input into the computation unit 220a of the processor 200a.

Figure 21B:
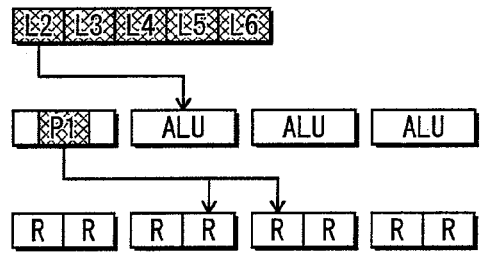

In FIG. 21(b), processed vertex data piece P1, which is obtained by the computation unit 220a of the processor 200a performing a vertex process, is transmitted to the registers 210b' and 210c' of the processors 200b and 200c. Also, vertex data L2 that is to be processed next is input into the computation unit 220b of the processor 200b.

Figure 21C:
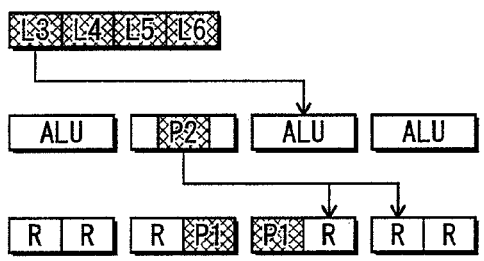

In FIG. 21(c), processed vertex data piece P2, which is obtained by the computation unit 220b of the processor 200b performing a vertex process, is transmitted to the registers 210c' and 210d' of the processors 200c and 200d. Also, vertex data L3 that is to be processed next is input into the computation unit 220c of the processor 200c.

Figure 21D:
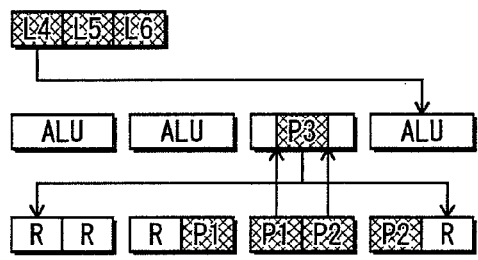

In FIG. 21(d), when the computation unit 220c of the processor 200c completes the vertex process, the processor 200c has three processed vertex data pieces, namely the processed vertex data pieces P1, P2, and P3 that are related to three vertices constituting the triangular polygon Δ1. Therefore, the computation unit 220c of the processor 200c performs the polygon process of the triangular polygon Δ1, by acquiring the processed vertex data pieces P1 and P2 from the registers 210c, and 210c' in the processor 200c that is the same processor as the one including the computation unit 220c. At this time, the processed vertex data pieces P1 and P2 are deleted from the registers 210c and 210c'. After the computation unit 220c of the processor 200c has performed a vertex process to obtain the processed vertex data piece P3, the processed vertex data piece P3 is transmitted to the registers 210d' and 210a of the processors 200d and 200a. The vertex data L4 that is to be processed next is input into the computation unit 220d of the processor 200d.

Figure 21E:
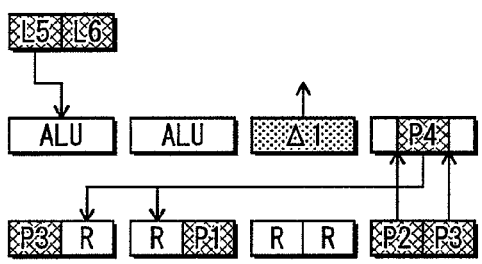

In FIG. 21(e), the computation unit 220c of the processor 200c outputs setup data obtained by completing the polygon process of the triangular polygon Δ1. When the computation unit 220d of the processor 200d completes a vertex process, the processor 200d has processed vertex data pieces P2, P3, and P4 that are related to three vertices constituting the triangular polygon Δ2. Therefore, the computation unit 220d of the processor 200d performs the polygon process of the triangular polygon Δ2, by acquiring the processed vertex data pieces P2 and P3 from the registers 210d and 210d', which are included in the same processor as the computation unit 220d. At this time, the processed vertex data pieces P2 and P3 are deleted from the registers 210d and 210d'. After the computation unit 220d of the processor 200d has performed a vertex process to obtain the processed vertex data piece P4, the processed vertex data piece P4 is transmitted to the registers 210a' and 210b of the processors 200a and 200b. The vertex data L5 that is to be processed next is input into the computation unit 220a of the processor 200a.

Figure 21F:
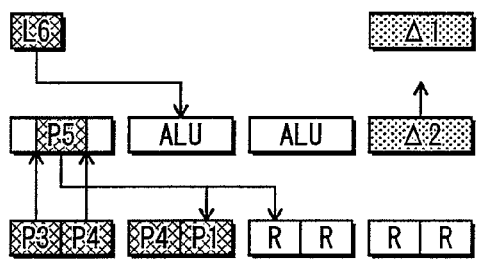

In FIG. 21(f), the computation unit 220d of the processor 200d outputs setup data obtained by completing the polygon process of the triangular polygon Δ2. When the computation unit 220a of the processor 200a completes a vertex process, the processor 200a has processed vertex data pieces P3, P4, and P5 that are related to three vertices constituting the triangular polygon Δ3. Therefore, the computation unit 220a of the processor 200a performs the polygon process of the triangular polygon Δ3, by acquiring the processed vertex data pieces P3 and P4 from the registers 210a and 210a', which are included in the same processor as the computation unit 220a. At this time, the processed vertex data pieces P3 and P4 are deleted from the registers 210a and 210a'. After the computation unit 220a of the processor 200a has performed a vertex process to obtain the processed vertex data piece P5, the processed vertex data piece P5 is transmitted to the registers 210b' and 210c of the processors 200b and 200c. At this time, the processed vertex data piece P1 stored in the register 210b' of the processor 200b is overwritten. The vertex data L6 that is to be processed next is input into the computation unit 220b of the processor 200b.

Figure 21G:
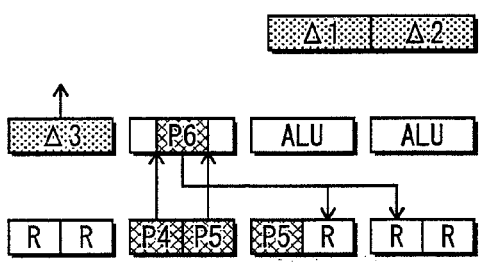
Figure 21H:
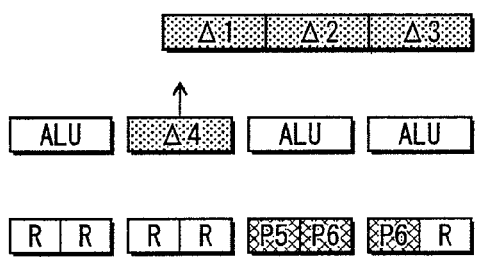

In FIG. 21(g), the computation unit 220a of the processor 200a outputs setup data obtained by completing the polygon process of the triangular polygon Δ3. When the computation unit 220a of the processor 200b completes a vertex process, the processor 200b has processed vertex data pieces P4, P5, and P6 that are related to three vertices constituting the triangular polygon Δ4. Therefore, the computation unit 220b of the processor 200b performs the polygon process of the triangular polygon Δ4, by acquiring the processed vertex data pieces P4 and P5 from the registers 210b and 210b', which are included in the same processor as the computation unit 220b. At this time, the processed vertex data pieces P4 and P5 are deleted from the registers 210b and 210b'. After the computation unit 220b of the processor 200b has performed a vertex process to obtain the processed vertex data piece P6, the processed vertex data piece P6 is transmitted to the registers 210c' and 210d of the processors 200c and 200d. Finally in FIG. 21(h), the computation unit 220b of the processor 200b outputs setup data obtained by completing the polygon process of the triangular polygon Δ4.

The processing device of the second embodiment of the present invention performs the geometry process as described above.

As described in the first embodiment, the processing device may start a vertex process for the first vertex of the triangle strip immediately after completion of the vertex process for the last vertex in the triangle strip.

Third Embodiment

In a third embodiment of the present invention, a description is provided of an example in which a plurality of processors in a processing device cyclically receive and transmit the processed vertex data. In the first and the second embodiments, each of the input/output units receives and transmits processed vertex data between a plurality of registers. However, in the third embodiment, each of the input/output units transmits processed vertex data to only one of the input/output units.

<Construction>

Figure 22:
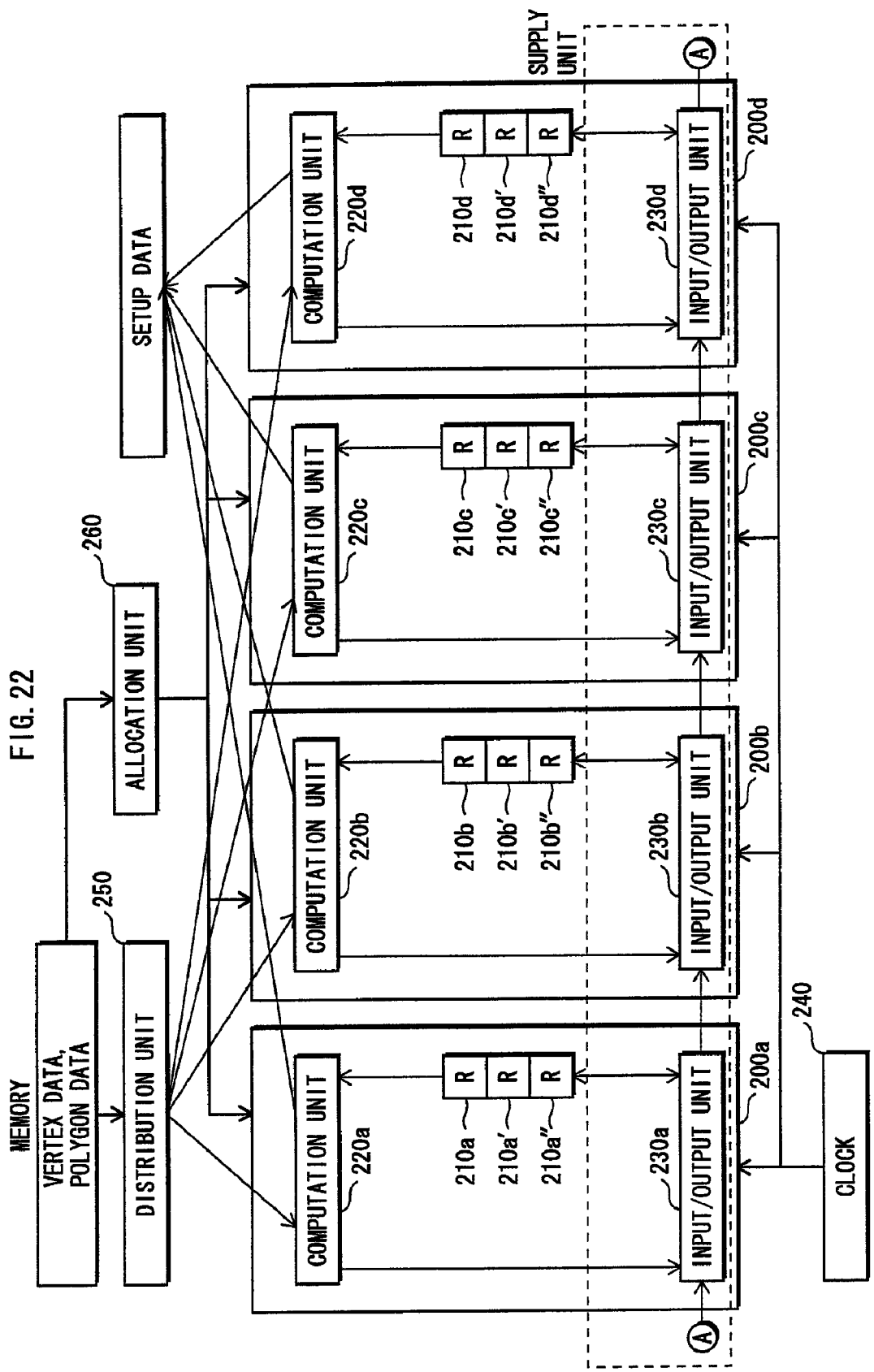
FIG. 22 shows a construction of a processing device in a third embodiment of the present invention.

FIG. 22 shows a construction of the processing device in the third embodiment of the present invention. The processing device in the third embodiment of the present invention includes: the four processors 200a, 200b, 200c, and 200d; the clock 240 for driving the processors; the distribution unit 250 for distributing vertex data to each processor; and the allocation unit 260 for allocating a processor that is for executing the polygon process. The third embodiment is the same as the first and the second embodiments on the point that each of the processors 200a, 200b, 200c, and 200d includes the registers 210a, 210b, 210c, and 210d, the computation units 220a, 220b, 220c, and 220d, and the input/output units 230a, 230b, 230c, and 230d, respectively. However, the processing device of the third embodiment is different from those of the first and the second embodiments, on the point that (i) each of the processors includes three registers, and (ii) each the input/output units cyclically receives and transmits processed vertex data.

In other words, it is determined that processed vertex data is transmitted as shown in FIG. 22. Specifically, the input/output unit 230a transmits processed vertex data to the input/output unit 230b. The input/output unit 230b transmits processed vertex data to the input/output unit 230c. The input/output unit 230c transmits processed vertex data to the input/output unit 230d. The input/output unit 230d transmits processed vertex data to the input/output unit 230a. Each of the input/output unit 230a, 230b, 230c, and 230d stores processed vertex data that has been transmitted in a register in each of the processors including a different one of the input/output units, if a computation unit of each of the processors needs the processed vertex data. If another processor still needs the processed vertex data for the polygon process that has yet to be started, each input/output unit transmits the processed vertex data to an input/output unit included in the next processor.

A register stores processed vertex data transmitted by an input/output unit.

A computation unit performs a vertex process on vertex data that is given, thereby obtaining processed vertex data. Then, the computation unit transfers the processed vertex data to the input/output unit, in order to send the processed vertex data to another processor. Also, the computation unit performs the polygon process on the processed vertex data sent from the register.

<Operation>

The following describes the operation of the processing device in the third embodiment of the present invention, with reference to FIG. 23. FIG. 23 shows an example of when the processing device processes the triangle fan shown in FIG. 4. In FIG. 23, ALUs represent the computation units 220a, 220b, 220c, and 220d, and Rs represent registers 210a, a', a", b, b', b", c, c', c", and d, d', d". The processing device in the third embodiment of the present invention includes four processors that are each shown by a combination of one computation unit and three registers. Three registers in each processor respectively correspond to, for example, a, a', a", starting from the top, FIG. 22.

Figure 23A:
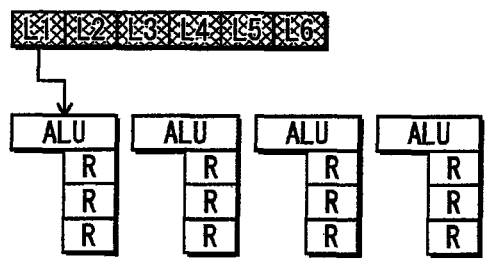
FIG. 23 explains an operation of the processing device in the third embodiment of the present invention.

FIG. 23(a) shows a state that is immediately before vertex data and polygon data are to be input into the processing device. In FIG. 23(a), vertex data L1 is input into the computation unit 220a of the processor 200a.

Figure 23B:
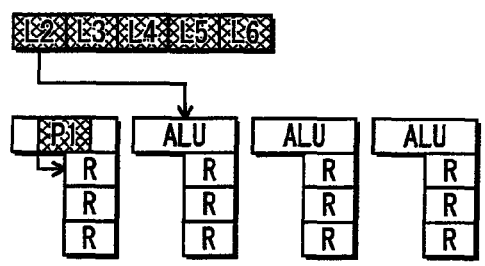

In FIG. 23(b), processed vertex data piece P1 obtained by the computation unit 220a of the processor 200a performing a vertex process is first transmitted to the register 210a of the processor 200a that includes the computation unit 220a. Vertex data L2 that is to be processed next is input into the computation unit 220a of the processor 200b.

Figure 23C:
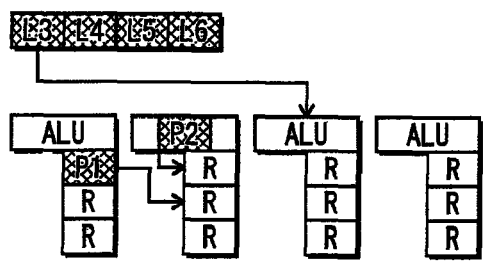

In FIG. 23(c), processed vertex data piece P2 obtained by the computation unit 220b of the processor 200b performing a vertex process is first transmitted to the register 210b of the processor 200b that is the same processor in which the computation unit 220b is included. The processed vertex data piece P1 stored in the register 210a of the processor 200a is not used in the polygon process performed by the computation unit 220a of the processor 200a, and therefore is transmitted to the register 210b' of the processor 200b. Vertex data L3 that is to be processed next is input into the computation unit 220c of the processor 200c.

Figure 23D:
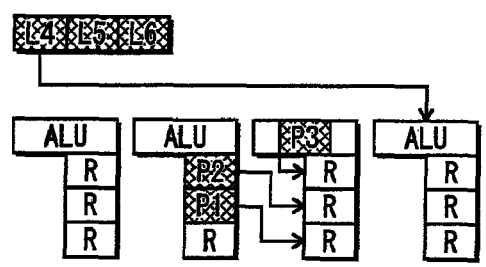

In FIG. 23(d), processed vertex data piece P3 obtained by the computation unit 220c of the processor 200c performing a vertex process is first transmitted to the register 210c of the processor 200c that is the same processor in which the computation unit 220c is included. The processed vertex data pieces P1 and P2 that are stored in the registers 210b and 210b' of the processor 200b are not used in the polygon process performed by the computation unit 220b of the processor 200b, and therefore are transmitted to the registers 210c' and 210c" of the processor 200c. Vertex data L4 that is to be processed next is input into the computation unit 220d of the processor 200d.

Figure 23E:
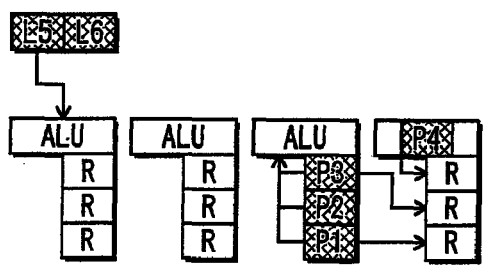

In FIG. 23(e), processed vertex data piece P4 obtained by the computation unit 220d of the processor 200d performing a vertex process is first transmitted to the register 210d of the processor 200d that is the same processor in which the computation unit 220d is included. The registers 210c, 210c', 210c" of the processor 200c have three processed vertex data pieces P1, P2, and P3. Therefore, the registers 210c, 210c', and 210c" send the processed vertex data pieces P1, P2, and P3, to the computation unit 220c of the processor 200c that is the same processor in which the computation unit 220c is included, so that the computation unit 220c can perform the polygon process of the triangular polygon Δ1. Also, P1 and P3 out of the processed vertex data pieces P1, P2, and P3 are used for the polygon process of a triangular polygon after the triangular polygon Δ1. Therefore, the processed vertex data pieces P1 and P3 are transmitted to the registers 210d' and 210d" of the processor 200d. Vertex data L5 that is to be processed next is input into the computation unit 220a of the processor 200a.

Figure 23F:
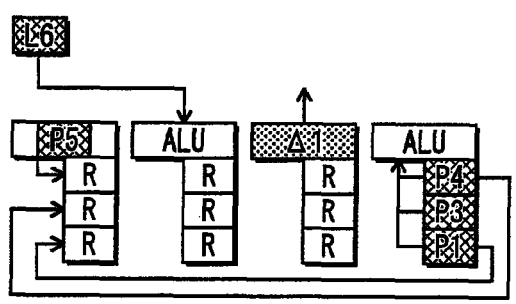

In FIG. 23(f), processed vertex data piece P5 obtained by the computation unit 220a of the processor 200a performing a vertex process is first transmitted to the register 210a of the processor 200a that is the same processor in which the computation unit 220a is included. The registers 210d, 210d', 210d" of the processor 200d have three processed vertex data pieces P1, P3, and P4. Therefore, the registers 210d, 210d', and 210d" send the processed vertex data pieces P1, P3, and P4, to the computation unit 220d of the processor 200d that is the same processor in which the computation unit 220d is included, so that the computation unit 220d can perform the polygon process of the triangular polygon Δ2. Also, P1 and P4 out of the processed vertex data pieces P1, P3, and P4 are used for the polygon process of a triangular polygon after the triangular polygon Δ2. Therefore, the processed vertex data pieces P1 and P4 are transmitted to the registers 210a' and 210a" of the processor 200a. After completing the polygon process, the computation unit 220c of the processor 200c outputs setup data that is related to the triangular polygon Δ1. Vertex data L6 that is to be processed next is input into the computation unit 220b of the processor 200b.

Figure 23G:
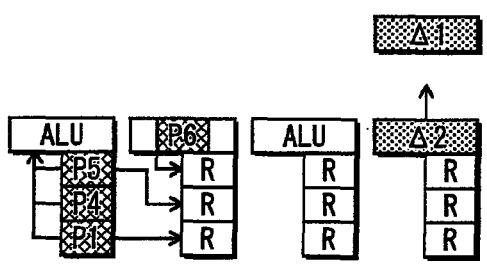

In FIG. 23(g), processed vertex data piece P6 obtained by the computation unit 220b of the processor 200b performing a vertex process is first transmitted to the register 210b of the processor 200b that is the same processor in which the computation unit 220b is included. The registers 210a, 210a', 210a" of the processor 200a have three processed vertex data pieces P1, P4, and P5. Therefore, the registers 210a, 210a', and 210a" send the processed vertex data pieces P1, P4, and P5, to the computation unit 220a of the processor 200a that is the same processor in which the computation unit 220a is included, so that the computation unit 220a can perform the polygon process of the triangular polygon Δ3. Also, P1 and P5 out of the processed vertex data pieces P1, P4, and P5 are used for the polygon process of a triangular polygon after the triangular polygon Δ3. Therefore, the processed vertex data pieces P1 and P5 are transmitted to the registers 210b' and 210b" of the processor 200b. After completing the polygon process, the computation unit 220d of the processor 200d outputs setup data that is related to the triangular polygon Δ2.

Figure 23H:
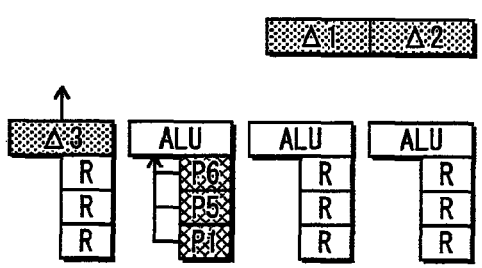

In FIG. 23(h), the registers 210b, 210b', and 210b" of the processor 200b have three processed vertex data pieces P1, P5, and P6. Therefore, the registers 210b, 210b', and 210b" send the processed vertex data pieces P1, P5, and P6, to the computation unit 220b of the processor 200b that is the same processor in which the registers 210b, 210b', and 210b" are included, so that the computation unit 220b can perform the polygon process of the triangular polygon Δ4.

This concludes a description of the geometry process of the processing device in the third embodiment of the present invention.

Other Embodiments

The above provides examples of methods in which four processors notify each other of processed vertex data. However, the number of processors is not limited to four. Also, the number of registers in each processor is not limited to the number specified above. The nature of the present invention is to notify each other of processed vertex data pieces that are each computed by a different processor, thereby enabling any of the processors to perform the polygon process. Therefore, methods of notifying the processed vertex data are not limited to the examples given above. For example, the processors may notify each other of processed vertex data via a cross-bus.

INDUSTRIAL APPLICABILITY

In the processing device of the present invention, a plurality of processors perform a geometry process for rendering a three-dimensional object by approximating the three-dimensional object with use of at least one polygon. Then the plurality of processors notify each other of processed vertex data pieces that are obtained by each of the processors performing a vertex process. This makes it possible for each of the processors to continuously perform the polygon process after completing the respective vertex processes, resulting in suppressing the occurrence of the unbalance of timing in performing the vertex process and the polygon process, thereby efficiently performing a computing process without causing the processors to have wasteful idle time. Therefore, even an apparatus having a low-performance processor, such as a mobile phone, can render an image without interruption. Furthermore, since the processors can take longer time in calculation, it is possible to reduce an operation clock, resulting in reducing power consumption and cost.

Also, the processors have a parallel structure in the processing device, thereby performing processes using the same program. Accordingly, it is not necessary to rewrite the program when the number of processors is increased or decreased, thereby achieving excellent extensibility.

The invention claimed is:

1. A processing device for processing a plurality of polygon meshes that each approximate a three-dimensional object with use of polygonal shapes, wherein
each polygon mesh includes a plurality of polygons and
processes for each polygon mesh include a coordinate transformation and a gradient calculation, the coordinate transformation being for transforming (i) sets of local coordinates of a plurality of vertices of each polygon mesh into (ii) sets of world coordinates of the plurality of vertices of each polygon mesh in a world coordinate system, the gradient calculation being for calculating gradients of each polygon mesh based on the respective set of world coordinates, and
the processing device comprises:
a plurality of processors each having a computation unit that performs the coordinate transformation and the gradient calculation;
a distribution unit operable to distribute the sets of local coordinates of the vertices of the polygon meshes to the computation units so that each set of the local coordinates is transformed by a different one of the computation units, and cause the computation units to perform the coordinate transformation;
an allocation unit operable to allocate each of the polygons to a respective one of the computation units that is to perform the gradient calculation; and
a supply unit operable to supply a set of world coordinates of each of the polygons to the respective one of the computation units allocated by the allocation unit.

2. The processing device of claim 1, wherein
the supply unit has input/output units respectively for the processors, and
each of the input/output units receives sets of world coordinates from a plurality of registers that belong to processors different from a processor including the input/output unit, and transmits the sets of world coordinates to a computation unit that belongs to the processor including the input/output unit.

3. The processing device of claim 1, wherein
the supply unit has input/output units respectively for the processors, and
each of the input/output units receives a set of world coordinates that have been transformed by a computation unit that belongs to a same processor as a processor including the input/output unit, and transmits the set of world coordinates to a plurality of registers that belong to processors different from the processor including the input/output unit.

4. The processing device of claim 1, wherein the supply unit has input/output units respectively for the processors,
each of the input/output units receives one of (i) a set of world coordinates that have been transformed by a computation unit that belongs to a same processor as a processor including the input/output unit and (ii) a set of world coordinates from a register that belongs to the same processor as the processor including the input/output unit, and transmits the set of world coordinates to a register that belongs to a processor different from the processor including the input/output unit, and
the input/output units in the plurality of processors are cyclically connected to each other in transmitting and receiving the sets of world coordinates.

5. The processing device of claim 1, wherein
the supply unit includes cross-bus switches arranged between (i) output stages of the computation units in the processors and (ii) input stages of registers in the processors.

6. The processing device of claim 1, wherein
each of the computation units performs the gradient calculation immediately after performing the coordinate transformation.

7. The processing device of claim 1 including a floating-point computation unit, wherein
the set of local coordinates of each of the vertices included in the polygon meshes have been transformed into a set of local coordinates of a float-point type.

8. The processing device of claim 1, wherein
each of the computation units starts the process of the coordinate transformation at a different time from each other computation unit.

9. The processing device of claim 1, wherein
each of the polygons included in the polygon meshes is triangular.

10. The processing device of claim 1, wherein
each of the computation units calculates, for a respective one of the polygons included in the polygon meshes, illuminance on edges of a polygon and inside of the polygon, based on illuminance of a plurality of vertices of the polygon.

11. The processing device of claim 1, wherein
the supply unit includes
a connection line connecting, in a pair of first and second processors that are adjacent to each other, (i) an output stage of a computation unit in the first processor with (ii) an input stage of a register in the second processor, and
a connection line connecting, in a pair of third processor positioned at one end of the plurality of processors and fourth processor positioned at a different end thereof, (i) an output stage of a computation unit in the third processor with (ii) an input stage of a register in the fourth processor.

12. The processing device of claim 11, wherein
the plurality of processors have a parallel structure in the processing device, and execute a same program.

13. A mobile phone comprising the processing device of claim 1, wherein the processing device performs the processes for each polygon mesh in a mobile game.

14. The mobile phone of claim 13, comprising
a memory,
wherein (i) a program and (ii) information that is related to edges and coordinates of each of the vertices of the polygon meshes have been downloaded from a network to the memory of the mobile phone.

15. The mobile phone of claim 13, comprising
a main processor and a memory,
wherein the processing device is notified by the main processor of the mobile phone of (i) an address of a region that has stored therein a program in the memory of the mobile phone, and (ii) information related to edges and coordinates of each of the vertices of the polygon meshes.

* * * * *